US011889468B2

(12) United States Patent
Xu et al.

(10) Patent No.: US 11,889,468 B2
(45) Date of Patent: Jan. 30, 2024

(54) PAGING EARLY INDICATION FOR PAGING OCCASION

(71) Applicant: QUALCOMM Incorporated, San Diego, CA (US)

(72) Inventors: Huilin Xu, Temecula, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/147,776

(22) Filed: Dec. 29, 2022

(65) Prior Publication Data

US 2023/0147443 A1 May 11, 2023

Related U.S. Application Data

(63) Continuation of application No. 17/805,964, filed on Jun. 8, 2022, now Pat. No. 11,546,878.

(60) Provisional application No. 63/263,609, filed on Nov. 5, 2021.

(51) Int. Cl.
| | |
|---|---|
| *H04W 68/00* | (2009.01) |
| *H04W 24/08* | (2009.01) |
| *H04W 56/00* | (2009.01) |
| *H04W 72/044* | (2023.01) |
| *H04W 72/23* | (2023.01) |

(52) U.S. Cl.
CPC ......... *H04W 68/005* (2013.01); *H04W 24/08* (2013.01); *H04W 56/001* (2013.01); *H04W 72/046* (2013.01); *H04W 72/23* (2023.01)

(58) Field of Classification Search
CPC . H04W 68/005; H04W 24/08; H04W 56/001; H04W 72/042; H04W 72/046
See application file for complete search history.

(56) References Cited

U.S. PATENT DOCUMENTS

| 11,546,878 | B1 | 1/2023 | Xu et al. | |
| 2021/0345455 | A1* | 11/2021 | Kodali | H04W 52/0216 |
| 2022/0046585 | A1* | 2/2022 | Wu | H04W 72/23 |

FOREIGN PATENT DOCUMENTS

| CN | 113163476 A | 7/2021 |
| WO | WO-2021180206 A1 | 9/2021 |

(Continued)

OTHER PUBLICATIONS

CATT: "Paging Enhancement for UE Power Saving", 3GPP TSG RAH WG1 #106-e, R1-2106983, 3rd Generation Partnership Project, Mobile Competence Centre, 650, Route Des Lucioles, F-06921 Sophia-Antipolis Cedex, France vol. RAN WG1, No. e-Meeting, Aug. 16, 2021-Aug. 27, 2021, Aug. 7, 2021, 36 Pages, XP052038156, paragraphs 2.1, 2.2, 4 and 5.

(Continued)

*Primary Examiner* — Kyaw Z Soe
(74) *Attorney, Agent, or Firm* — Harrity & Harrity, LLP

(57) ABSTRACT

Various aspects of the present disclosure generally relate to wireless communication. In some aspects, a user equipment (UE) may receive a paging early indication that indicates one or more paging occasions (POs) in a quantity of paging frames based at least in part on a maximum quantity of paging frames. The UE may process a physical downlink control channel communication received in a PO of the one or more POs. Numerous other aspects are described.

30 Claims, 15 Drawing Sheets

(56) References Cited

FOREIGN PATENT DOCUMENTS

WO  WO-2022151979 A1  7/2022
WO  WO-2022205096 A1  10/2022

OTHER PUBLICATIONS

Moderator (Mediatek): "Summary#6 of Paging Enhancements", 3GPP TSG RAN WG1 #106-e, R1-2108660, 3rd Generation Partnership Project, Mobile Competence Centre, 650, Route Des Lucioles, F-06921 Sophia-Antipolis Cedex, France vol. RAN WG1, No. e-Meeting, Aug. 16, 2021-Aug. 27, 2021, Sep. 3, 2021, 107 Pages, XP052047768, paragraph 3.
Partial International Search Report—PCT/US2022/077788—ISA/EPO—dated Jan. 27, 2023.
CATT: "Details of PEI Configuration", 3GPP TSG RAN WG1 #104-e, R1-2100394, 3RD Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, pp. 1-6 , XP051970997, Paragraphs 2.2 and 2.2.1.
International Search Report and Written Opinion—PCT/US2022/077788—ISA/EPO—dated Mar. 22, 2023.
Lenovo et al., "Paging Enhancement for UE Power Saving", 3GPP TSG RAN WG1 Meeting #106-e, R1-2107182, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021 Aug. 7, 2021, XP052038210, pp. 1-6, Paragraphs 2 to 2.2.1.
Moderator (Mediatek): "Summary#5 of Paging Enhancements", 3GPP TSG RAN WG1 #106bis-e, R1-2110671, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Oct. 22, 2021, XP052065871, 51 Pages, pp. 4-5, 19, 23, 29-34, 39, 42-43, Paragraph 4.1.
Nokia., et al., "On Paging Enhancements for UE Power Saving", 3GPP TSG RAN WG1 #106bis-e, R1-2110311, 3rd Generation Partnership Project (3GPP), Mobile Competence Centre, 650, Route Des Lucioles, F-06921 Sophia- Antipolis Cedex, France, vol. Ran WG1, No. e-Meeting, Oct. 11, 2021-Oct. 19, 2021, Oct. 1, 2021, 10 Pages, XP052059244, Paragraphs 2 to 2.1.1 and 4.

\* cited by examiner

PAGING EARLY INDICATION FOR PAGING OCCASION

CROSS-REFERENCE TO RELATED APPLICATION

This application is continuation of U.S. patent application Ser. No. 17/805,964, filed Jun. 8, 2022 (now U.S. Pat. No. 11,546,878), entitled "PAGING EARLY INDICATION FOR PAGING OCCASION," which claims priority to U.S. Provisional Patent Application No. 63/263,609, filed on Nov. 5, 2021, entitled "PAGING EARLY INDICATION FOR PAGING OCCASION," the contents of which are incorporated herein by reference in their entireties.

FIELD OF THE DISCLOSURE

Aspects of the present disclosure generally relate to wireless communication and to techniques and apparatuses for using a paging early indication to indicate a paging occasion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include memory, one or more processors coupled to the memory, and instructions stored in the memory and executable by the one or more processors. The instructions may be executable by the one or more processors to cause the user equipment to receive a paging early indication (PEI) that indicates one or more paging occasions (POs) in a quantity of paging frames based at least in part on a maximum quantity of paging frames. The instructions may be executable by the one or more processors to cause the UE to process a physical downlink control channel (PDCCH) communication received in a PO of the one or more POs.

Some aspects described herein relate to a network entity for wireless communication. The network entity may include memory, one or more processors coupled to the memory, and instructions stored in the memory and executable by the one or more processors. The instructions may be executable by the one or more processors to cause the network entity to transmit, to a UE, a PEI that indicates one or more POs in a quantity of paging frames based at least in part on a maximum quantity of paging frames. The instructions may be executable by the one or more processors to cause the network entity to transmit a PDCCH communication for the UE in a PO of the one or more POs.

Some aspects described herein relate to a UE for wireless communication. The UE may include memory, one or more processors coupled to the memory, and instructions stored in the memory and executable by the one or more processors. The instructions may be executable by the one or more processors to cause the user equipment to receive a first PEI in a symbol in a beam. The instructions may be executable by the one or more processors to cause the UE to receive a second PEI in a next symbol in a next beam.

Some aspects described herein relate to a UE for wireless communication. The UE may include memory, one or more processors coupled to the memory, and instructions stored in the memory and executable by the one or more processors. The instructions may be executable by the one or more processors to cause the UE to receive a first PEI in a symbol in a beam. The instructions may be executable by the one or more processors to cause the UE to receive a second PEI in a next symbol in a next beam, where the first PEI and the second PEI are received across synchronization signal block (SSB) beams first.

Some aspects described herein relate to a method of wireless communication performed by a UE. The method may include receiving a PEI that indicates one or more POs in a quantity of paging frames based at least in part on a maximum quantity of paging frames. The method may include processing a PDCCH communication received in a PO of the one or more POs.

Some aspects described herein relate to a method of wireless communication performed by a network entity. The method may include transmitting, to a UE, a PEI that indicates one or more POs in a quantity of paging frames based at least in part on a maximum quantity of paging frames. The method may include transmitting a PDCCH communication for the UE in a PO of the one or more POs.

Some aspects described herein relate to a method of wireless communication performed by a UE. The method may include receiving a first PEI in a symbol in a beam. The method may include receiving a second PEI in a next symbol in a next beam.

Some aspects described herein relate to a method of wireless communication performed by a network entity. The method may include receiving a first PEI in a symbol in a beam. The method may include receiving a second PEI in a next symbol in a next beam, where the first PEI and the second PEI are received across SSB beams first.

Some aspects described herein relate to a non-transitory computer-readable medium that stores one or more instructions for wireless communication by a UE. The one or more instructions, when executed by one or more processors of the UE, may cause the UE to receive a PEI that indicates one or more POs in a quantity of paging frames based at least in part on a maximum quantity of paging frames. The one or more instructions, when executed by one or more processors of the UE, may cause the UE to process a PDCCH communication received in a PO of the one or more POs.

Some aspects described herein relate to a non-transitory computer-readable medium that stores one or more instructions for wireless communication by a network entity. The one or more instructions, when executed by one or more processors of the network entity, may cause the network entity to transmit, to a UE, a PEI that indicates one or more POs in a quantity of paging frames based at least in part on a maximum quantity of paging frames. The one or more instructions, when executed by one or more processors of the network entity, may cause the network entity to transmit a PDCCH communication for the UE in a PO of the one or more POs.

Some aspects described herein relate to a non-transitory computer-readable medium that stores one or more instructions for wireless communication by a UE. The one or more instructions, when executed by one or more processors of the UE, may cause the UE to receive a first PEI in a symbol in a beam. The one or more instructions, when executed by one or more processors of the UE, may cause the UE to receive a second PEI in a next symbol in a next beam.

Some aspects described herein relate to a non-transitory computer-readable medium that stores one or more instructions for wireless communication by a UE. The one or more instructions, when executed by one or more processors of the UE, may cause the UE to receive a first PEI in a symbol in a beam. The one or more instructions, when executed by one or more processors of the UE, may cause the UE to receive a second PEI in a next symbol in a next beam, where the first PEI and the second PEI are received across SSB beams first.

Some aspects described herein relate to an apparatus for wireless communication. The apparatus may include means for receiving a PEI that indicates one or more POs in a quantity of paging frames based at least in part on a maximum quantity of paging frames. The apparatus may include means for processing a PDCCH communication received in a PO of the one or more POs.

Some aspects described herein relate to an apparatus for wireless communication. The apparatus may include means for transmitting, to another apparatus, a PEI that indicates one or more POs in a quantity of paging frames based at least in part on a maximum quantity of paging frames. The apparatus may include means for transmitting a PDCCH communication for the other apparatus in a PO of the one or more POs.

Some aspects described herein relate to an apparatus for wireless communication. The apparatus may include means for receiving a first PEI in a symbol in a beam. The apparatus may include means for receiving a second PEI in a next symbol in a next beam.

Some aspects described herein relate to an apparatus for wireless communication. The apparatus may include means for receiving a first PEI in a symbol in a beam. The apparatus may include means for receiving a second PEI in a next symbol in a next beam, where the first PEI and the second PEI are received across SSB beams first.

Some aspects described herein relate to a method of wireless communication performed by a UE. The method may include receiving an SSB transmission. The method may include receiving a PEI at a time that is associated with the SSB transmission. The method may include determining that the PEI indicates PO that applies to the UE if a time difference between a start of the SSB transmission and a start of monitoring occasions or an associated paging frame satisfies a threshold. The method may include processing a PDCCH communication received in the PO.

Some aspects described herein relate to a method of wireless communication performed by a network entity. The method may include transmitting, to a UE, an SSB transmission. The method may include transmitting, to the UE, a PEI at a time that is associated with the SSB transmission, where the PEI indicates a PO that applies to the UE if a time difference between a start of the SSB transmission and a start of monitoring occasions or an associated paging frame satisfies a threshold. The method may include transmitting a PDCCH communication for the UE in the PO.

Some aspects described herein relate to a UE for wireless communication. The UE may include memory, one or more processors coupled to the memory, and instructions stored in the memory and executable by the one or more processors. The instructions may be executable by the one or more processors to cause the UE to receive an SSB transmission. The instructions may be executable by the one or more processors to cause the UE to receive a PEI at a time that is associated with the SSB transmission. The instructions may be executable by the one or more processors to cause the UE to determine that the PEI indicates a PO that applies to the UE if a time difference between a start of the SSB transmission and a start of monitoring occasions or an associated paging frame satisfies a threshold. The instructions may be executable by the one or more processors to cause the UE to process a PDCCH communication received in the PO.

Some aspects described herein relate to a network entity for wireless communication. The network entity may include memory, one or more processors coupled to the memory, and instructions stored in the memory and executable by the one or more processors. The instructions may be executable by the one or more processors to cause the network entity to transmit, to a UE, an SSB transmission. The instructions may be executable by the one or more processors to cause the network entity to transmit, to the UE, a PEI at a time that is associated with the SSB transmission, where the PEI indicates a PO that applies to the UE if a time difference between a start of the SSB transmission and a start of monitoring occasions or an associated paging frame satisfies a threshold. The instructions may be executable by the one or more processors to cause the network entity to transmit a PDCCH communication for the UE in the PO.

Some aspects described herein relate to a non-transitory computer-readable medium that stores one or more instructions for wireless communication by a UE. The one or more instructions, when executed by one or more processors of the UE, may cause the UE to receive an SSB transmission. The one or more instructions, when executed by one or more processors of the UE, may cause the UE to receive a PEI at a time that is associated with the SSB transmission. The one or more instructions, when executed by one or more processors of the UE, may cause the UE to determine that the PEI indicates a PO that applies to the UE if a time difference between a start of the SSB transmission and a start of monitoring occasions or an associated paging frame satisfies a threshold. The one or more instructions, when executed by one or more processors of the UE, may cause the UE to process a PDCCH communication received in the PO.

Some aspects described herein relate to a non-transitory computer-readable medium that stores one or more instructions for wireless communication by a network entity. The one or more instructions, when executed by one or more processors of the network entity, may cause the network entity to transmit, to a UE, an SSB transmission. The one or more instructions, when executed by one or more processors of the network entity, may cause the network entity to transmit, to the UE, a PEI at a time that is associated with the SSB transmission, where the PEI indicates a PO that applies to the UE if a time difference between a start of the SSB transmission and a start of monitoring occasions or an associated paging frame satisfies a threshold. The one or more instructions, when executed by one or more processors of the network entity, may cause the network entity to transmit a PDCCH communication for the UE in the PO.

Some aspects described herein relate to an apparatus for wireless communication. The apparatus may include means for receiving an SSB transmission. The apparatus may include means for receiving a PEI at a time that is associated with the SSB transmission. The apparatus may include means for determining that the PEI indicates a PO that applies to the apparatus if a time difference between a start of the SSB transmission and a start of monitoring occasions or an associated paging frame satisfies a threshold. The apparatus may include means for processing a PDCCH communication received in the PO.

Some aspects described herein relate to an apparatus for wireless communication. The apparatus may include means for transmitting, to a UE, an SSB transmission. The apparatus may include means for transmitting, to the UE, a PEI at a time that is associated with the SSB transmission, where the PEI indicates a PO that applies to the UE if a time difference between a start of the SSB transmission and a start of monitoring occasions or an associated paging frame satisfies a threshold. The apparatus may include means for transmitting a PDCCH communication for the UE in the PO.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
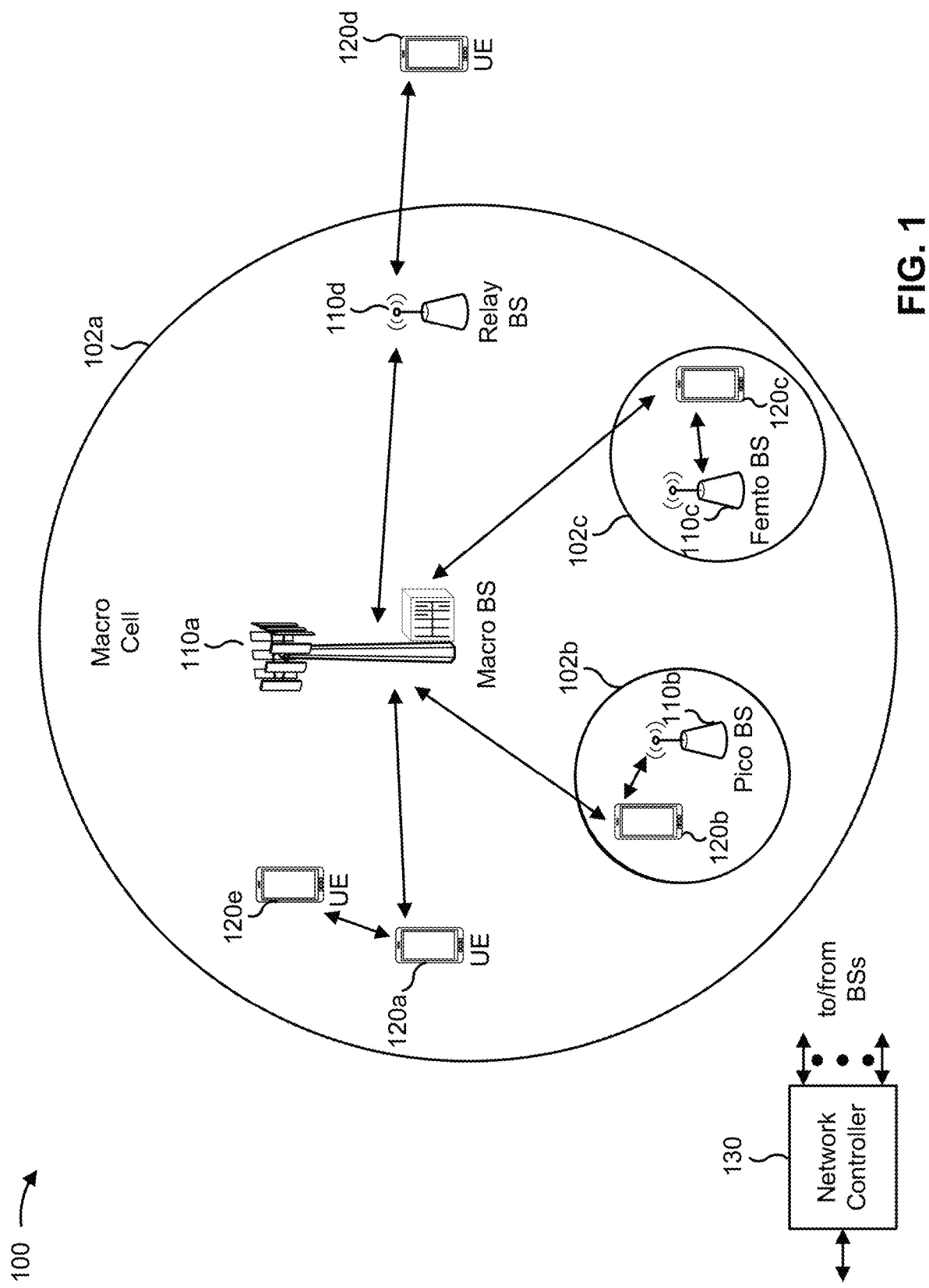
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity"

may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes network entities (e.g., base stations 110) of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a synchronization signal block (SSB) transmission and receive a paging early indication (PEI) at a time that is associated with the SSB transmission. The communication manager 140 may determine that the PEI indicates a paging occasion (PO) that applies to the UE if a time difference between a start of the SSB transmission and a start of monitoring occasions or an associated paging frame satisfies a threshold, and process a physical downlink control channel (PDCCH) communication received in the PO.

In some aspects, a network entity (e.g., base station 110) may include a communication manager 150. As described in more detail elsewhere herein, the communication manager 150 may transmit, to a UE, an SSB transmission and transmit, to the UE, a PEI at a time that is associated with the SSB transmission, where the PEI indicates a PO that applies to the UE if a time difference between a start of the SSB transmission and a start of monitoring occasions or an associated paging frame satisfies a threshold. The communication manager 150 may transmit a PDCCH communication for the UE in the PO In some aspects, the communication manager 140 may receive a PEI that indicates one or more POs in a quantity of paging frames based at least in part on a maximum quantity of paging frames and process a PDCCH communication received in a PO of the one or more POs.

In some aspects, the communication manager 140 may receive a first PEI in a symbol in a beam and receive a second PEI in a next symbol in a next beam. Additionally, or alternatively, the communication manager 140 may perform one or more other operations described herein.

In some aspects, the communication manager 150 may transmit, to a UE, a PEI that indicates one or more POs in a quantity of paging frames based at least in part on a maximum quantity of paging frames and transmit a PDCCH communication for the UE in a PO of the one or more POs.

In some aspects, the communication manager 150 may receive a first PEI in a symbol in a beam and receive a second PEI in a next symbol in a next beam, where the first PEI and the second PEI are received across SSB beams first. Additionally, or alternatively, the communication manager 150 may perform one or more other operations described herein.

As indicated above, FIG. 1 is provided as an example. Other examples may differ from what is described with regard to FIG. 1.

Figure 2:
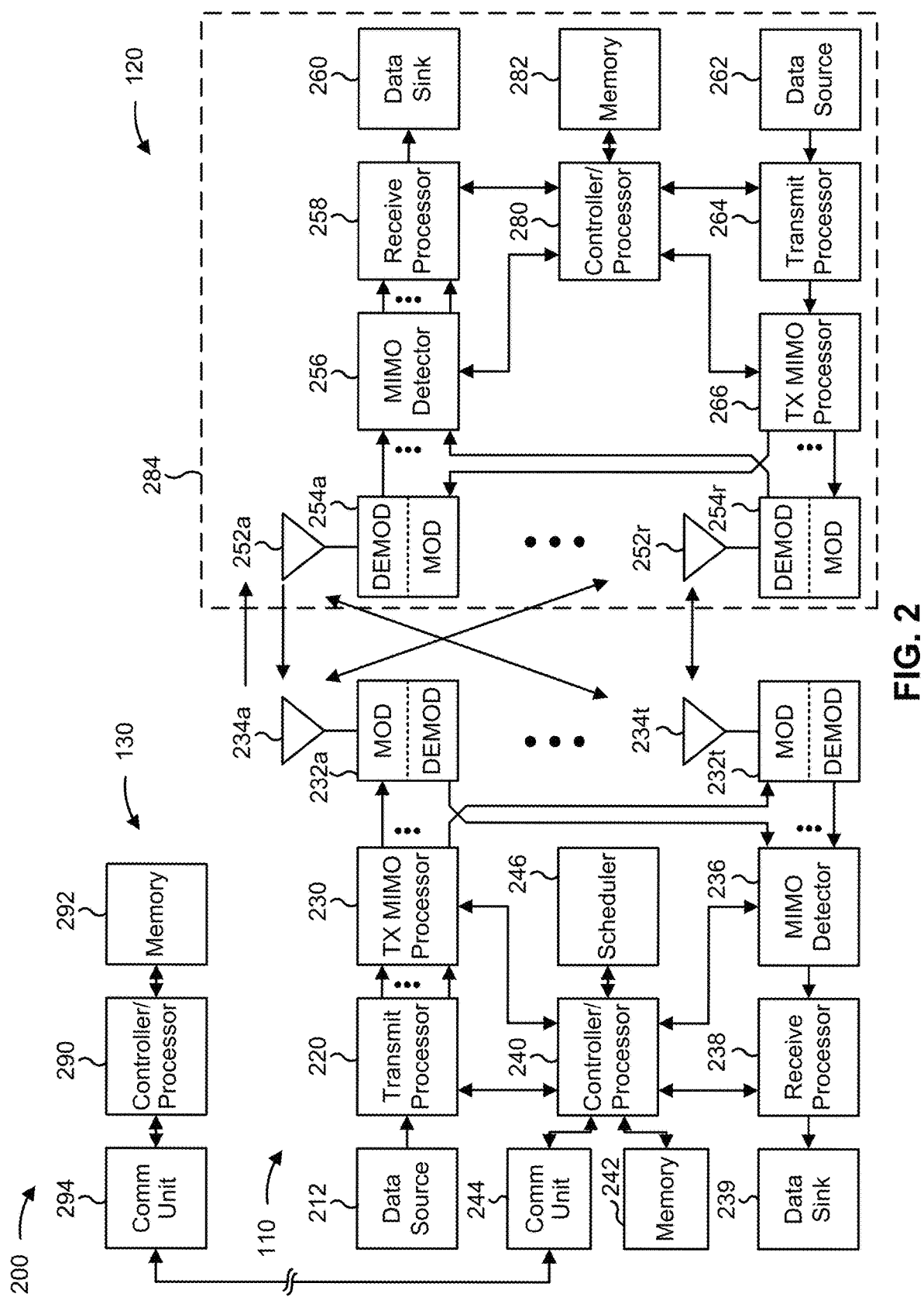
FIG. 2 is a diagram illustrating an example of a base station in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-15).

The controller/processor 240 of a network entity (e.g., base station 110), the controller/processor 280 of the UE 120, and/or any other component(s) of FIG. 2 may perform one or more techniques associated with using a PEI associated with an SSB to indicate a PO, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving an SSB transmission; means for receiving a PEI at a time that is associated with the SSB transmission; means for determining that the PEI indicates a PO that applies to the UE if a time difference between a start of the SSB transmission and a start of monitoring occasions or an associated paging frame satisfies a threshold; and/or means for processing a PDCCH communication received in the PO. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting, to a UE, an SSB transmission; means for transmitting, to the UE, a PEI at a time that is associated with the SSB transmission, where the PEI indicates a PO that applies to the UE if a time difference between a start of the SSB transmission and a start of monitoring occasions or an associated paging frame satisfies a threshold; and/or means for transmitting a PDCCH communication for the UE in the PO. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving a PEI that indicates one or more POs in a quantity of paging frames based at least in part on a maximum quantity of paging frames; and/or means for processing a PDCCH communication received in a PO of the one or more POs.

In some aspects, the network entity includes means for transmitting, to a UE, a PEI that indicates one or more POs in a quantity of paging frames based at least in part on a maximum quantity of paging frames; and/or means for transmitting a PDCCH communication for the UE in a PO of the one or more POs.

In some aspects, the UE 120 includes means for receiving a first PEI in a symbol in a beam; and/or means for receiving a second PEI in a next symbol in a next beam.

In some aspects, the network entity includes means for receiving a first PEI in a symbol in a beam; and/or means for receiving a second PEI in a next symbol in a next beam, where the first PEI and the second PEI are received across SSB beams first.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
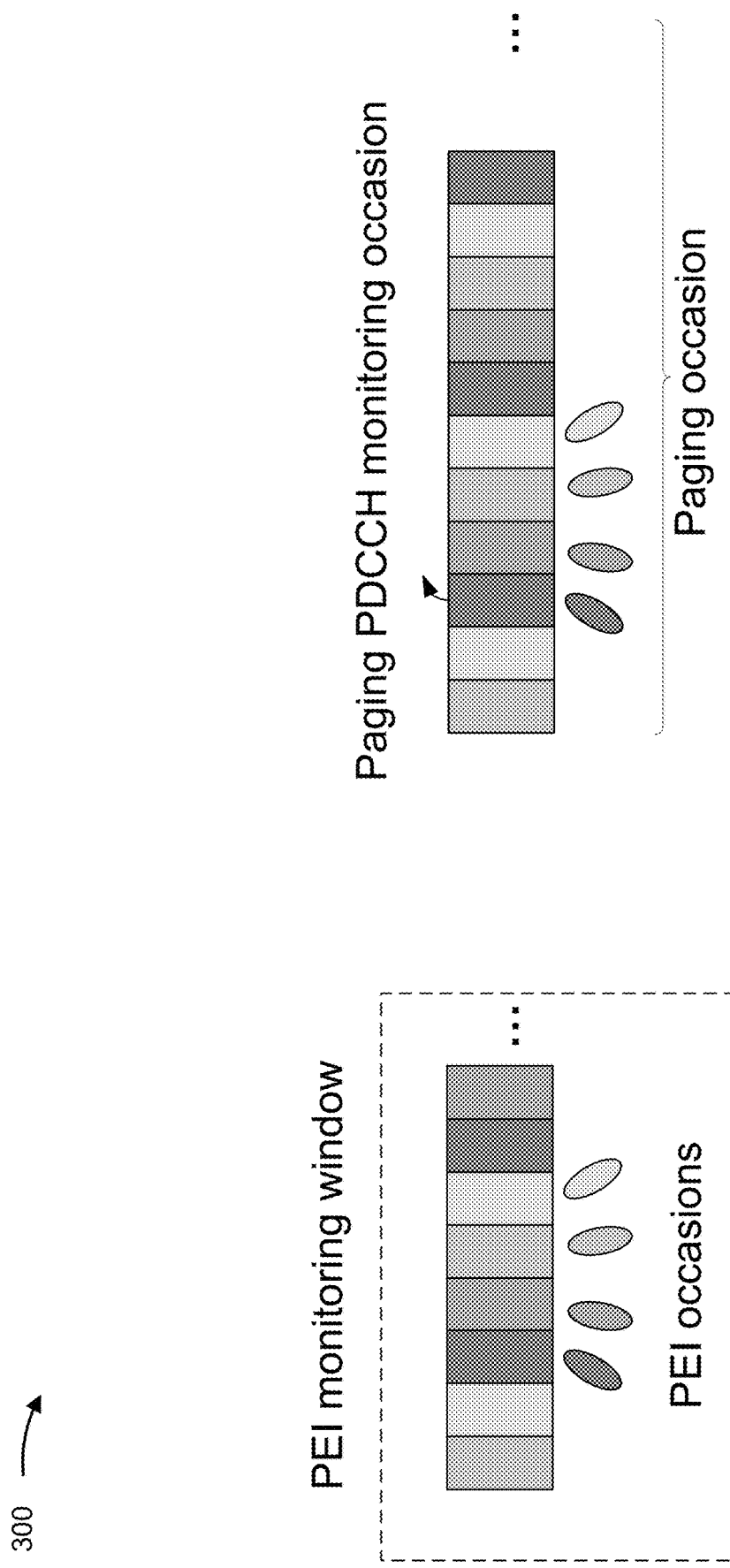
FIG. 3 is a diagram illustrating an example of paging early indications (PEIs) and paging occasions (POs), in accordance with the present disclosure.

FIG. 3 is a diagram illustrating an example 300 of PEIs and POs, in accordance with the present disclosure.

A UE may enter an idle or inactive mode to save power. A network entity (e.g., base station 110) may transmit PDCCH communications (e.g., downlink control information (DCI), paging PDCCH) addressed to one or more UEs. The network entity may transmit a PDCCH communication during a PO, which is a time occasion during which the UE may wake up and process the PDCCH communication. POs may be periodic or otherwise scheduled such that the UE does not need to be constantly awake to be paged. The UE may monitor for a PDCCH communication during a specific time (for a specific beam) during the PO. This specific time may be one of a set of monitoring occasions (MOs). The set of MOs may be included in the PO, and one or more POs may be included in a paging frame (PF). The UE is not expected to wake up and process a PDCCH communication for each PO, and thus a network entity may transmit a PEI beforehand to indicate whether the UE is to process a PDCCH communication at an upcoming PO.

An SSB may carry information used for initial network acquisition and synchronization, such as a PSS, an SSS, a physical broadcast channel (PBCH), and a PBCH DMRS. For example, an SSB may be 4 symbols that include an SSS, a PSS, and a PBCH. An SSB is sometimes referred to as a synchronization signal/PBCH (SS/PBCH) block. The SSB may be used for tracking loop updates or radio resource management measurements. In some aspects, the network entity may transmit multiple SSBs in an SSB burst on multiple corresponding beams, and the SSBs may be used for beam selection.

Aligning an SSB and a PEI may be power efficient. If the time of the SSB and the time of the PEI are aligned, a UE may be configured to wake up and receive both the SSB and the PEI close in time to each other or overlapping in time. Waking up once for both the SSB and the PEI, rather than waking up separately for the SSB and the PEI, saves power. POs between two SSB bursts may be indicated by a PEI that is close to the first SSB burst. Alternatively, the PEI may be aligned with an SSB before the start of a PF that contains the PO. In typical channel conditions, the UE only processes one SSB. Even if the UE processes more than one SSB, with a single wakeup, the UE is still saving power.

Paging messages on the PDCCH and a physical downlink shared channel (PDSCH) may be transmitted on all SSB beams, with the same content across the SSB beams. A PEI may also be transmitted on all SSB beams following the same beam sweeping pattern as the paging PDCCH. An idle/inactive UE may track one beam and receive a PEI and a paging PDCCH/PDSCH from that beam. Example 300 shows PEI occasions in a PEI monitoring window and PDCCH MOs of a PO in which a PDCCH communication may be received. A PEI occasion may be a set of S consecutive PDCCH MOs when nrofPDCCH-MonitoringOccasionPerSSB-InPO is not configured. S may be the quantity of actual transmitted SSBs determined according to ssb-PositionsInBurst in a system information block 1 (SIB1). The Kth PDCCH MO for PEI in the PEI occasion has the same quasi-co-location (QCL) assumption as that of the Kth PDCCH MO for paging in the PO. The time of a PEI occasion for a target PO may be based on, for example, the first PDCCH monitoring occasion of the PEI occasion, which may be provided with respect to an Lth SSB burst before the first PDCCH MO of the target PO.

As indicated above, FIG. 3 is provided as an example. Other examples may differ from what is described with regard to FIG. 3.

Figure 4:
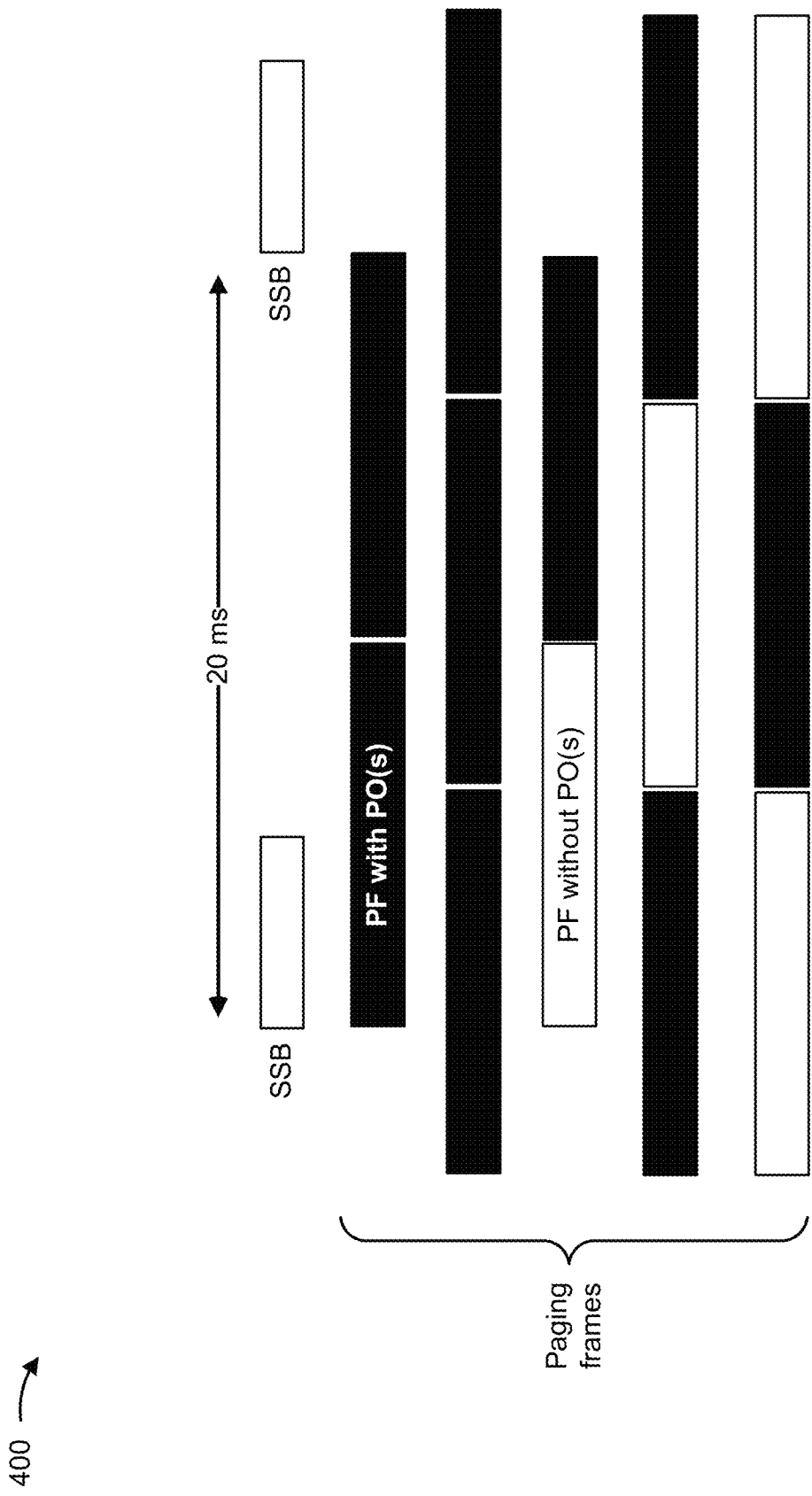
FIG. 4 is a diagram illustrating an example of paging frames (PFs), in accordance with the present disclosure.

FIG. 4 is a diagram illustrating an example 400 of PFs, in accordance with the present disclosure. Example 400 shows PFs, where some PFs include one or more POs (dark boxes) and some PFs do not include POs (light boxes).

For a PEI, a UE may support a DCI format that includes paging indications to UE group(s)/subgroups of associated PO(s). A UE may support a maximum of 8 subgroups for each PO. If N subgroups are configured for each PO, and the PEI indicates M POs, a DCI size of the PEI may be at least N*M. Depending on the paging frame configuration, there may be 1 to 3 PFs overlapping the SSB, after the SSB, and/or before the next SSB.

For example, one bit in the DCI payload may indicate one UE subgroup of a PO or one UE group/PO. There may be a maximum quantity of total bits for a paging indication field in a PEI DCI format. One PEI can be configured to indicate up to 4 PO(s) in a PF. A PEI may be mapped to up to 3 POs in a PF. A PEI may indicate POs across multiple PFs.

Depending on the SSB configuration and paging configuration, there can be an SSB burst that is close in time or that overlaps with the paging PDCCH monitoring occasion of a PO. However, it is not clear how a UE is to determine whether the PEI associated with an SSB contains an indication for the PO in which the UE is to wake up and process a PDCCH communication. Without further information, the UE may miss processing an applicable PDCCH communication or wake up for more POs than necessary, which consumes additional processing resources and battery power.

As indicated above, FIG. 4 is provided as an example. Other examples may differ from what is described with regard to FIG. 4.

Figure 5:
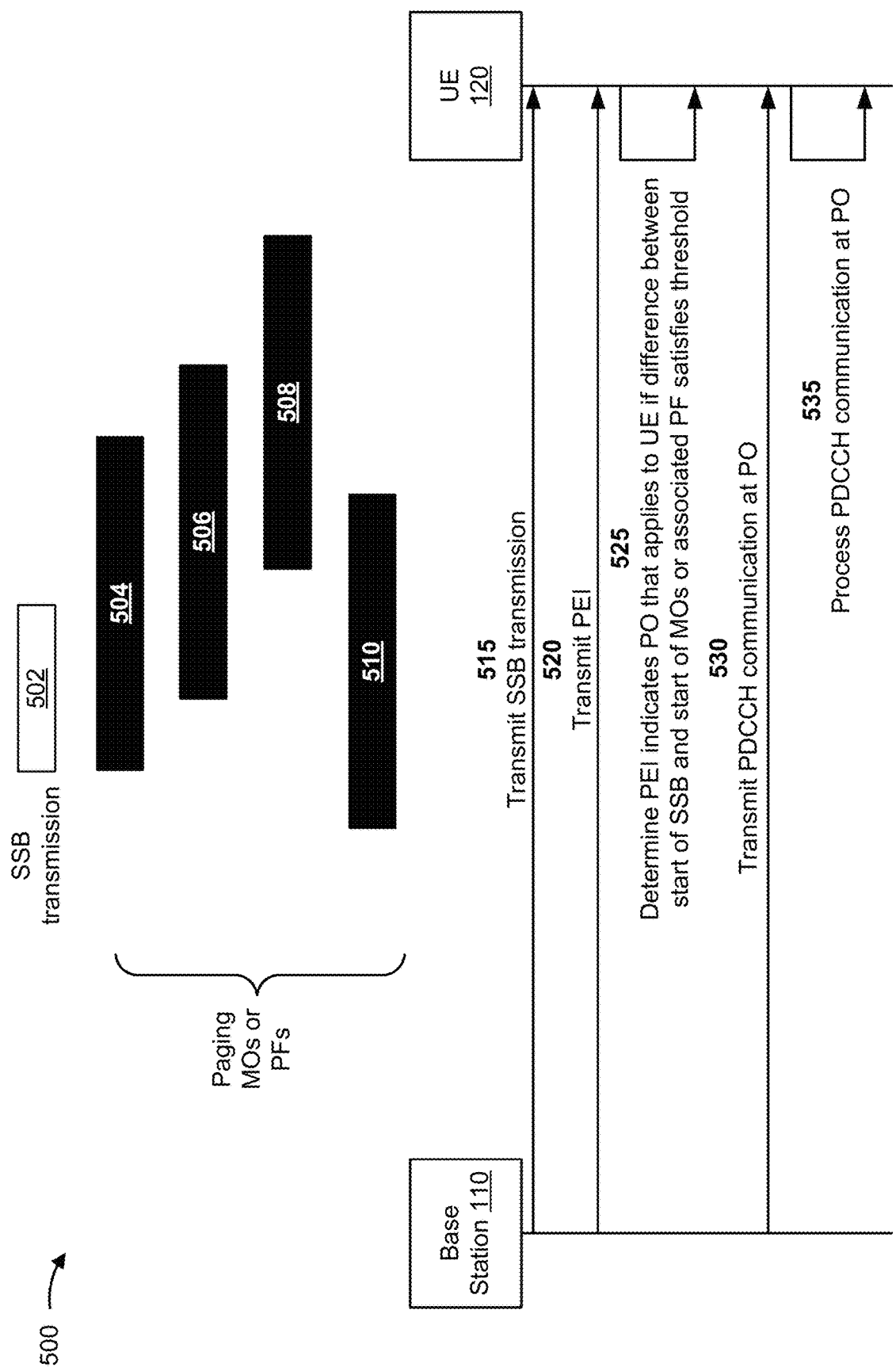
FIG. 5 is a diagram illustrating an example of a PEI that is associated with a synchronization signal block (SSB), in accordance with the present disclosure.

FIG. 5 is a diagram illustrating an example 500 of a PEI that is associated with an SSB, in accordance with the present disclosure. As shown in FIG. 5, a network entity (e.g., base station 110) and a UE (e.g., a UE 120) may communicate with one another. Example 500 shows an SSB transmission 502 that may be associated with a set of MOs or a PF that includes the set of MOs.

The MOs or PF may start at different times with respect to the SSB transmission 502. Paging MOs or PF 504 may represent the MOs or PF that starts at the same time as the SSB transmission 502. Paging MOs or PF 506 is an example of the MOs or PF that starts after the SSB transmission 502 but before an end of the SSB transmission 502 or the start of a next SSB transmission. Paging MOs or PF 508 is an example of the MOs or PF that starts after the SSB transmission 502 ends but before the start or end of the next SSB transmission. Paging MOs or PF 510 is an example of the MOs or PF that starts before the start of the SSB transmission 502.

As shown by reference number 515, the base station 110 may transmit the SSB transmission to the UE 120. The SSB transmission may include an SSB for a single beam, the PDCCH MO may refer to an SSB on the same beam, and the PEI may refer to a PEI on the same beam. Alternatively, the SSB transmission may include an SSB burst for multiple beams, the PDCCH monitoring occasion may include PDCCH MOs on all beams, and the PEI may be on all beams. As shown by reference number 520, the base station 110 may transmit a PEI to the UE 120. The SSB transmission may be associated with the PEI. That is, a time (PEI location) of the PEI may be close in time or overlapping with the SSB.

According to various aspects described herein, the UE 120 may determine whether a PEI received at a time (PEI location) that is associated with an SSB transmission indicates a PO that applies to the UE 120, such that the UE 120 wakes up and processes a PDCCH communication at the PO. The UE 120 may determine that a PO applies based at least in part on how close a start time of the MOs or an associated PF corresponding to the PEI aligns with a start time of the SSB. A PF that includes the PO is associated with the PO. The MOs or PF may correspond to the PEI if the PEI indicates one or more POs in the MOs or PF. The UE 120 may compare a difference between start times to a threshold (e.g., maximum time difference). The difference may satisfy the threshold if the difference is less than the maximum time difference. As shown by reference number 525, the UE 120 may determine that the PEI indicates a PO that applies to the UE 120 if a time difference between a start of the SSB transmission and a start of MOs or an associated PF satisfies a threshold. That is, the UE 120 may compare a start of the SSB to a start of the MOs in a PF, or compare the start of the SSB to a start of the PF that is associated with the MOs (e.g., includes the MOs).

The threshold may be satisfied (e.g., start time differences within a specified maximum time difference) in one of several scenarios. For example, the threshold may be satisfied in a scenario where the SSB transmission 502 starts at the same time as the MOs or PF (shown by paging MOs or PF 504). The threshold may be satisfied in a scenario where the SSB transmission 502 starts soon after the MOs or PF (shown by paging MOs or PF 506). There may be a minimum time gap (e.g., in OFDM symbols) between the start of the SSB transmission 502 and the start of the paging MOs or PF 504 for a processing delay of the SSB transmission 502. The threshold may be satisfied in a scenario where the SSB transmission 502 ends before the MOs or PF (shown by paging MOs or PF 508). There may be a minimum time gap (e.g., in OFDM symbols) between the end of the SSB transmission 502 and the start of the paging MOs or PF 508 for a processing delay of the SSB transmission 502. The threshold may be satisfied in a scenario where the SSB transmission 502 starts after the MOs or PF (shown by paging MOs or PF 510). The duration of the MOs or PF containing the PO may overlap with the SSB transmission 502. In sum, the start time differences may be compared in each of the scenarios, and if the start time differences are within a specified maximum difference, the PEI is sufficiently aligned with the SSB transmission 502 and the PO in the MOs or PF and that is indicated by the PEI applies to the UE 120.

As shown by reference number 530, the base station 110 may transmit a PDCCH communication at the PO, among other PDCCH communications at other POs. As shown by reference number 535, the UE 120, having monitored for the PO at a relevant MO, may process the PDCCH communication that was received at the PO. By using a comparison of an SSB transmission time and the time of the MOs of a PEI (one option) or the time of the PF of the PEI (another option), the UE 120 may determine whether a PO indicated by the PEI applies to the UE 120. As a result, the UE 120 may conserve processing resources and battery power by waking up at an appropriate PO.

If the SSB transmission 502 is a single beam, due to per beam association between the SSB transmission 502 and the MO, the PEI for two MOs of the same PO on different beams may be aligned with SSBs in different SSB bursts, because the interval between SSBs on different beams can be different than the interval between corresponding MOs on these beams.

As indicated above, FIG. 5 is provided as an example. Other examples may differ from what is described with respect to FIG. 5.

Figure 6:
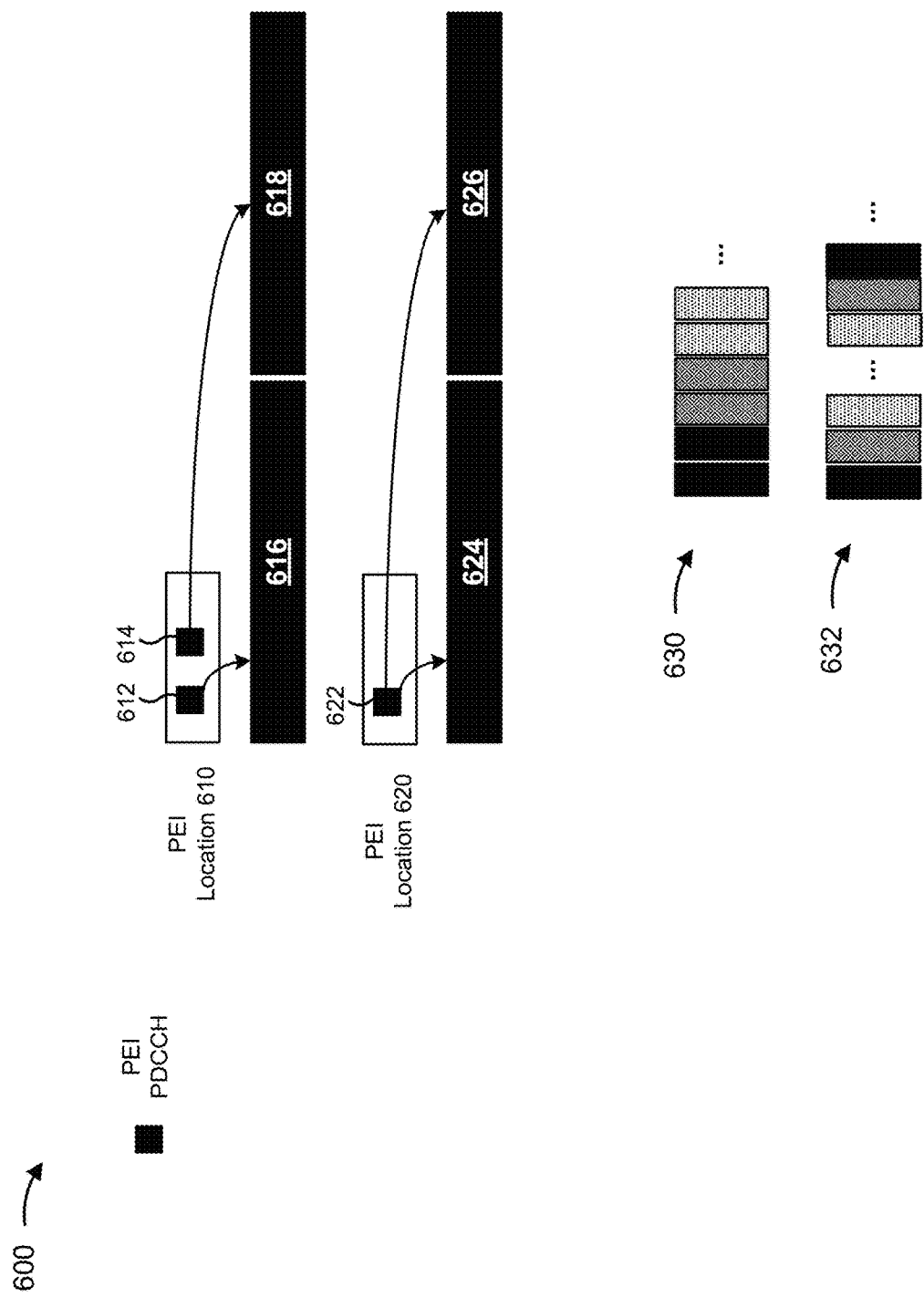
FIG. 6 is a diagram illustrating an example of PEI physical downlink control channel communications that carry PEIs, in accordance with the present disclosure.

FIG. 6 is a diagram illustrating an example 600 of PEI PDCCH communications that carry PEIs, in accordance with the present disclosure.

Within each PEI location (time) there may be a single PEI or multiple PEIs transmitted by the network. Example 600 shows a PEI location 610 with two PEIs, which may be in PEI PDCCH communications 612 and 614 (e.g., DCI). The PEI in PEI PDCCH communication 612 may indicate one or more POs in PF 616, and the PEI in PEI PDCCH communication 614 may indicate one or more POs in PF 618. Example 600 also shows a PEI location 620 with a PEI PDCCH communication 622 that includes a PEI that indicates one or more POs in each of PF 624 and PF 626.

In some aspects, a PEI PDCCH communication at a PEI location may include a PEI that indicates POs associated with the PEI location across PFs. POs associated with the PEI location may be configured with a maximum quantity of PFs. For example, the maximum quantity of PFs may be 3 for an SSB periodicity of 20 ms. In some aspects, the PEI may indicate POs with the same PF.

In some aspects, the quantity of POs may be determined by a maximum DCI size of the PEI PDCCH (e.g., 12 bits, 16 bits, 32 bits). For example, the quantity of POs indicated by the same PEI in the PEI PDCCH may be determined based at least in part on a floor (greatest integer less than or equal to) of a maximum quantity of bits in the PEI PDCCH DCI divided by the quantity of sub-groups per PO (up to 8 sub-groups per PO). In sum, the UE 120 may determine a set of POs indicated by or associated with one or more PEI PDCCH communications at a PEI location.

In some aspects, the PEI PDCCH communication (or a PEI in the PEI PDCCH communication) may include a bitmap with bits that indicate one or more POs for each of one or more PFs. The bitmap may contain bits in the following order: bits for the first indicated PF, bits for the second indicated PF, and bits for the third indicated PF, if possible. Within bits for each PF, there may be a first bit for the first PO, a second bit for the second PO, if possible, and so forth. The first PO indicated by the PEI may not be the same as the first PO in the PF if a subset of POs of the PF can be indicated by a bitmap of the PEI. Within bits for each PO, there may be a first bit for sub-group 0, a second bit for sub-group 1, if possible, and so forth.

In some aspects, if more than one PEI PDCCH communication falls within the same PEI location (e.g., start time and duration), the base station 110 may transmit the PEI PDCCH communications (that include the PEIs) in different OFDM symbols. Example 630 shows that PEI PDCCH communications associated with different sets of POs on the same SSB beam are transmitted first. For example, the base station 110 may transmit a first PEI in a symbol in a beam and a second PEI at the time in a next symbol in the beam. Different shades are used for different SSB beams in FIG. 6.

Example 632 shows that PEI PDCCH communications associated with the same sets of POs are transmitted across SSB beams. The PEI PDCCH communications may be transmitted across the SSB beams first before a repetition of a PEI PDCCH communication is transmitted on an SSB beam. For example, the base station 110 may, when transmitting the PEI at the time (PEI time location), transmit a first PEI at the time in a symbol in a beam and a second PEI at the time in a next symbol in the next beam. A PEI PDCCH communication associated with the same set of POs may be transmitted according to one of up to 3 patterns (e.g., if a PEI PDCCH communication is associated with POs within a single PF and with an SSB periodicity of 20 ms). By transmitting a PEI for multiple POs within a PEI PDCCH, rather than transmitting a PEI for each PO in separate PEI PDCCHs, the UE 120 and the base station 110 conserve processing resources, signaling resources, and power.

As indicated above, FIG. 6 is provided as an example. Other examples may differ from what is described with regard to FIG. 6.

Figure 7:
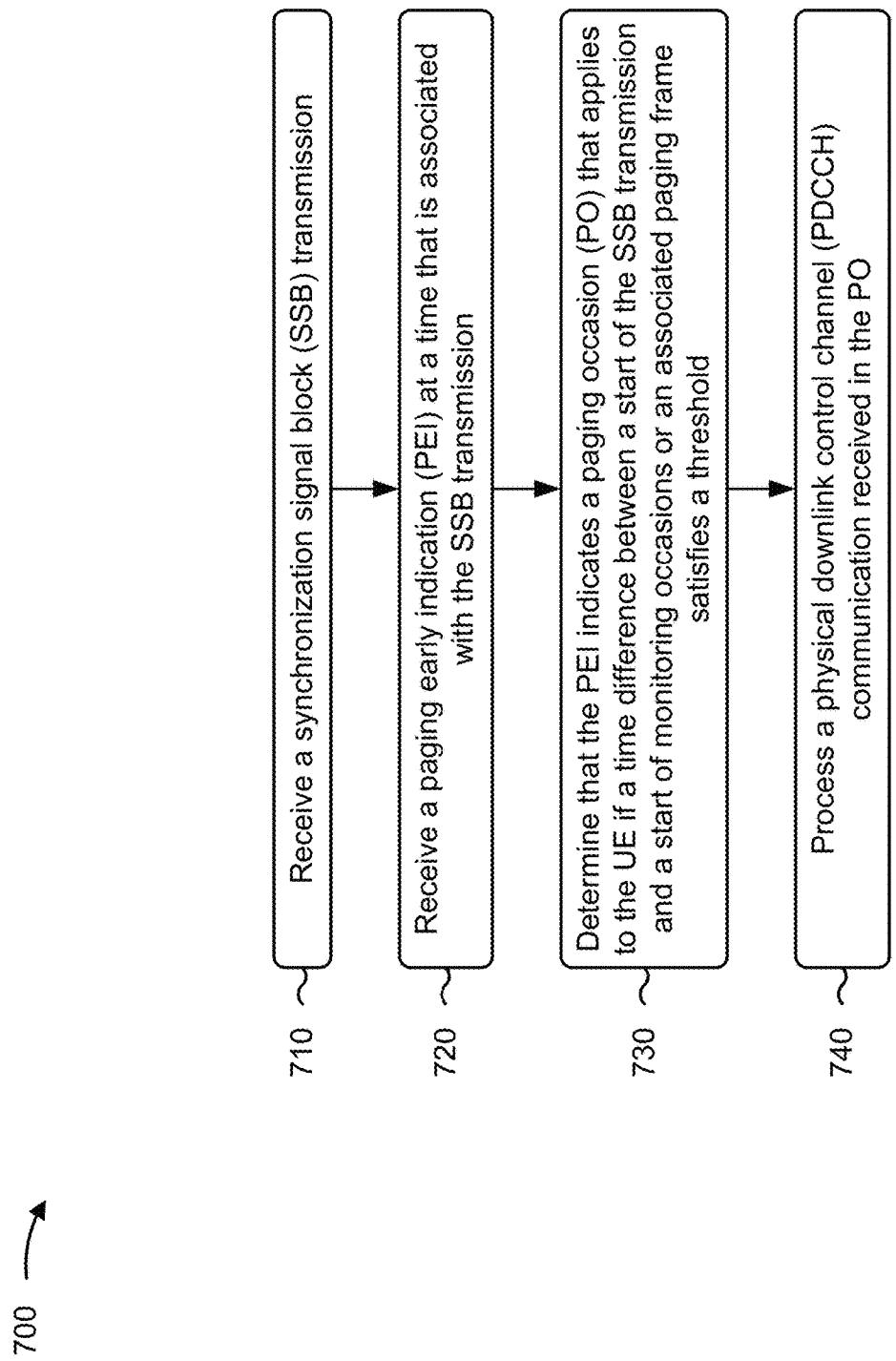
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with using a PEI association with an SSB to determine a PO that applies to the UE.

As shown in FIG. 7, in some aspects, process 700 may include receiving an SSB transmission (block 710). For example, the UE (e.g., using communication manager 140 and/or reception component 1302 depicted in FIG. 13) may receive an SSB transmission, as described above.

As further shown in FIG. 7, in some aspects, process 700 may include receiving a PEI at a time that is associated with the SSB transmission (block 720). For example, the UE (e.g., using communication manager 140 and/or reception component 1302 depicted in FIG. 13) may receive a PEI at a time that is associated with the SSB transmission, as described above.

As further shown in FIG. 7, in some aspects, process 700 may include determining that the PEI indicates a PO that applies to the UE if a time difference between a start of the SSB transmission and a start of monitoring occasions or an associated paging frame satisfies a threshold (block 730). For example, the UE (e.g., using communication manager 140 and/or determination component 1308 depicted in FIG. 13) may determine that the PEI indicates a PO that applies to the UE if a time difference between a start of the SSB transmission and a start of monitoring occasions or an associated paging frame satisfies a threshold, as described above.

As further shown in FIG. 7, in some aspects, process 700 may include processing a PDCCH communication received in the PO (block 740). For example, the UE (e.g., using communication manager 140 and/or processing component 1310 depicted in FIG. 13) may process a PDCCH communication received in the PO, as described above.

Process 700 may include additional aspects, such as any single aspect or any combination of aspects described below and/or in connection with one or more other processes described elsewhere herein.

In a first aspect, the start of the SSB transmission is at a same time as the start of the monitoring occasions or the associated paging frame.

In a second aspect, alone or in combination with the first aspect, the start of the monitoring occasions or the associated paging frame is after a start of the SSB transmission and before a start of a next SSB transmission.

In a third aspect, alone or in combination with one or more of the first and second aspects, the start of the monitoring occasions or the associated paging frame is after an end of the SSB transmission and before an end of a next SSB transmission.

In a fourth aspect, alone or in combination with one or more of the first through third aspects, the start of the monitoring occasions or the associated paging frame is before a start of the SSB transmission.

In a fifth aspect, alone or in combination with one or more of the first through fourth aspects, the SSB transmission includes an SSB for a single beam. In a sixth aspect, alone or in combination with one or more of the first through fifth aspects, the SSB transmission includes an SSB burst for multiple beams.

In a seventh aspect, alone or in combination with one or more of the first through sixth aspects, the PEI indicates one or more POs across multiple paging frames. In an eighth aspect, alone or in combination with one or more of the first through seventh aspects, the PEI indicates one or more POs within a same paging frame.

In a ninth aspect, alone or in combination with one or more of the first through eighth aspects, the PEI indicates a quantity of POs that is based at least in part on a maximum size of DCI that includes the PEI. In a tenth aspect, alone or in combination with one or more of the first through ninth aspects, the quantity of POs is further based at least in part on a quantity of sub-groups for each PO.

In an eleventh aspect, alone or in combination with one or more of the first through tenth aspects, the PEI includes a bitmap with bits that indicate one or more POs for each of one or more paging frames. In a twelfth aspect, alone or in combination with one or more of the first through eleventh aspects, the bitmap includes bits that specify one or more subgroups for each of the one or more POs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
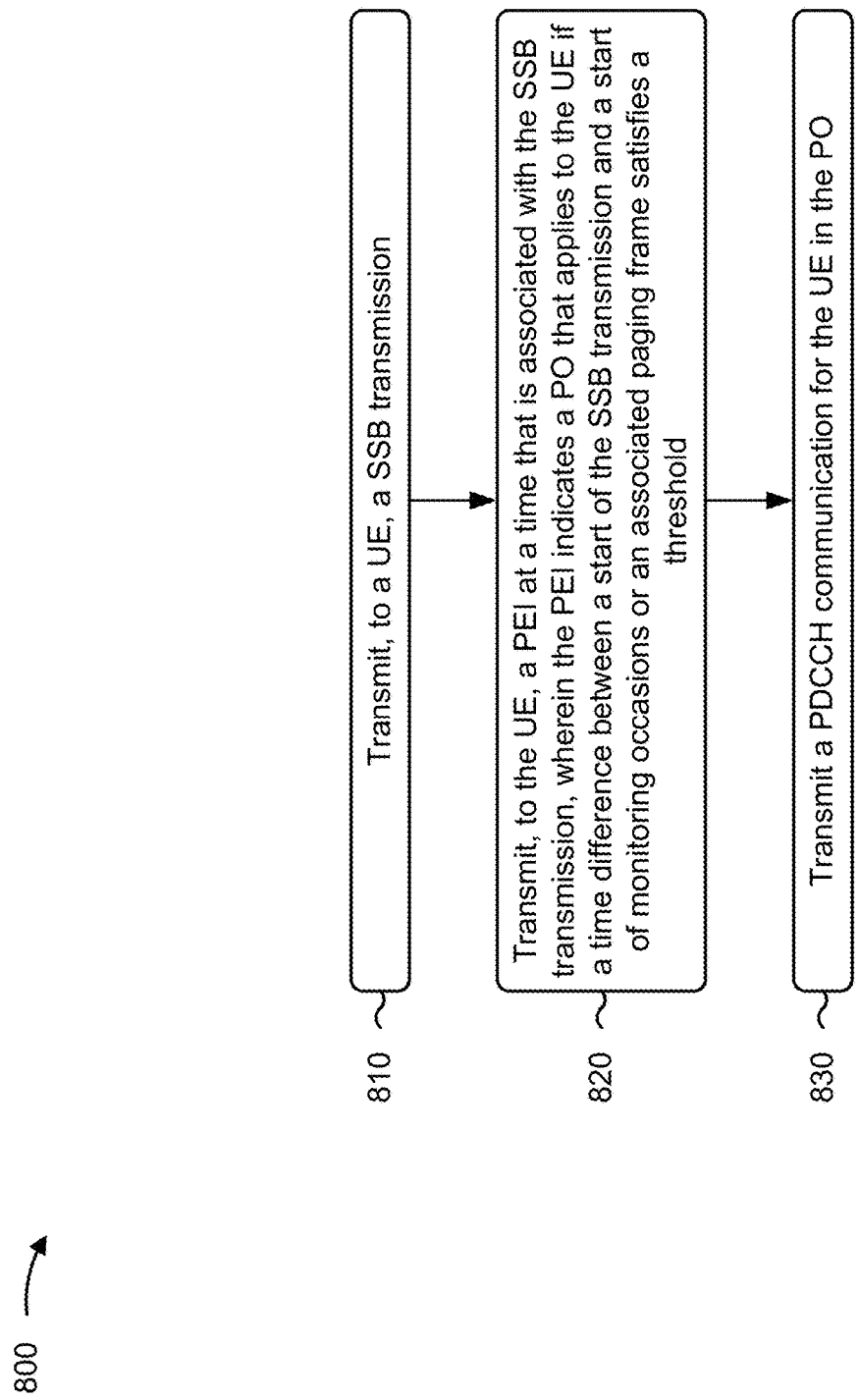
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., base station 110) performs operations associated with transmitting a PEI in associated with an SSB to indicate a PO that applies to a UE.

As shown in FIG. 8, in some aspects, process 800 may include transmitting, to the UE, an SSB transmission (block 810). For example, the network entity (e.g., using communication manager 150 and/or transmission component 1404 depicted in FIG. 14) may transmit, to the UE, an SSB transmission, as described above.

As further shown in FIG. 8, in some aspects, process 800 may include transmitting, to the UE, a PEI at a time that is associated with the SSB transmission, where the PEI indicates a PO that applies to the UE if a time difference between a start of the SSB transmission and a start of monitoring occasions or an associated paging frame satisfies a threshold (block 820). For example, the network entity (e.g., using communication manager 150 and/or transmission component 1404 depicted in FIG. 14) may transmit, to the UE, a PEI at a time that is associated with the SSB transmission, where the PEI indicates a PO that applies to the UE if a time difference between a start of the SSB transmission and a start of monitoring occasions or an associated paging frame satisfies a threshold, as described above.

As further shown in FIG. 8, in some aspects, process 800 may include transmitting a PDCCH communication for the UE in the PO (block 830). For example, the network entity (e.g., using communication manager 150 and/or transmission component 1404 depicted in FIG. 14) may transmit a PDCCH communication for the UE in the PO, as described above.

Process 800 may include additional aspects, such as any single aspect or any combination of aspects described below and/or in connection with one or more other processes described elsewhere herein.

In a first aspect, the start of the SSB transmission is at a same time as the start of the monitoring occasions or the associated paging frame.

In a second aspect, alone or in combination with the first aspect, the start of the monitoring occasions or the associated paging frame is after a start of the SSB transmission and before a start of a next SSB transmission.

In a third aspect, alone or in combination with one or more of the first and second aspects, the start of the monitoring occasions or the associated paging frame is after an end of the SSB transmission and before an end of a next SSB transmission.

In a fourth aspect, alone or in combination with one or more of the first through third aspects, the start of the monitoring occasions or the associated paging frame is before a start of the SSB transmission.

In a fifth aspect, alone or in combination with one or more of the first through fourth aspects, the SSB transmission includes an SSB for a single beam. In a sixth aspect, alone or in combination with one or more of the first through fifth aspects, the SSB transmission includes an SSB burst for multiple beams.

In a seventh aspect, alone or in combination with one or more of the first through sixth aspects, the PEI indicates one or more POs across multiple paging frames. In an eighth aspect, alone or in combination with one or more of the first through seventh aspects, the transmitting the PEI includes transmitting the PEI to indicate one or more POs in a quantity of paging frames based at least in part on a maximum quantity of paging frames.

In a ninth aspect, alone or in combination with one or more of the first through eighth aspects, the PEI indicates one or more POs within a same paging frame.

In a tenth aspect, alone or in combination with one or more of the first through ninth aspects, the PEI indicates a quantity of POs that is based at least in part on a maximum size of DCI that includes the PEI.

In an eleventh aspect, alone or in combination with one or more of the first through tenth aspects, the quantity of POs is further based at least in part on a quantity of sub-groups for each PO.

In a twelfth aspect, alone or in combination with one or more of the first through eleventh aspects, the PEI includes a bitmap with bits that indicate one or more POs for each of one or more paging frames.

In a thirteenth aspect, alone or in combination with one or more of the first through twelfth aspects, the bitmap includes bits that specify one or more subgroups for each of the one or more POs.

In a fourteenth aspect, alone or in combination with one or more of the first through thirteenth aspects, the transmitting the PEI at the time includes transmitting a first PEI in a symbol in a beam, and process 800 includes transmitting a second PEI at the time in a next symbol in the beam.

In a fifteenth aspect, alone or in combination with one or more of the first through fourteenth aspects, the transmitting the PEI at the time includes transmitting a first PEI in a symbol in a beam, and process 800 includes transmitting a second PEI at the time in a next symbol in a next beam.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
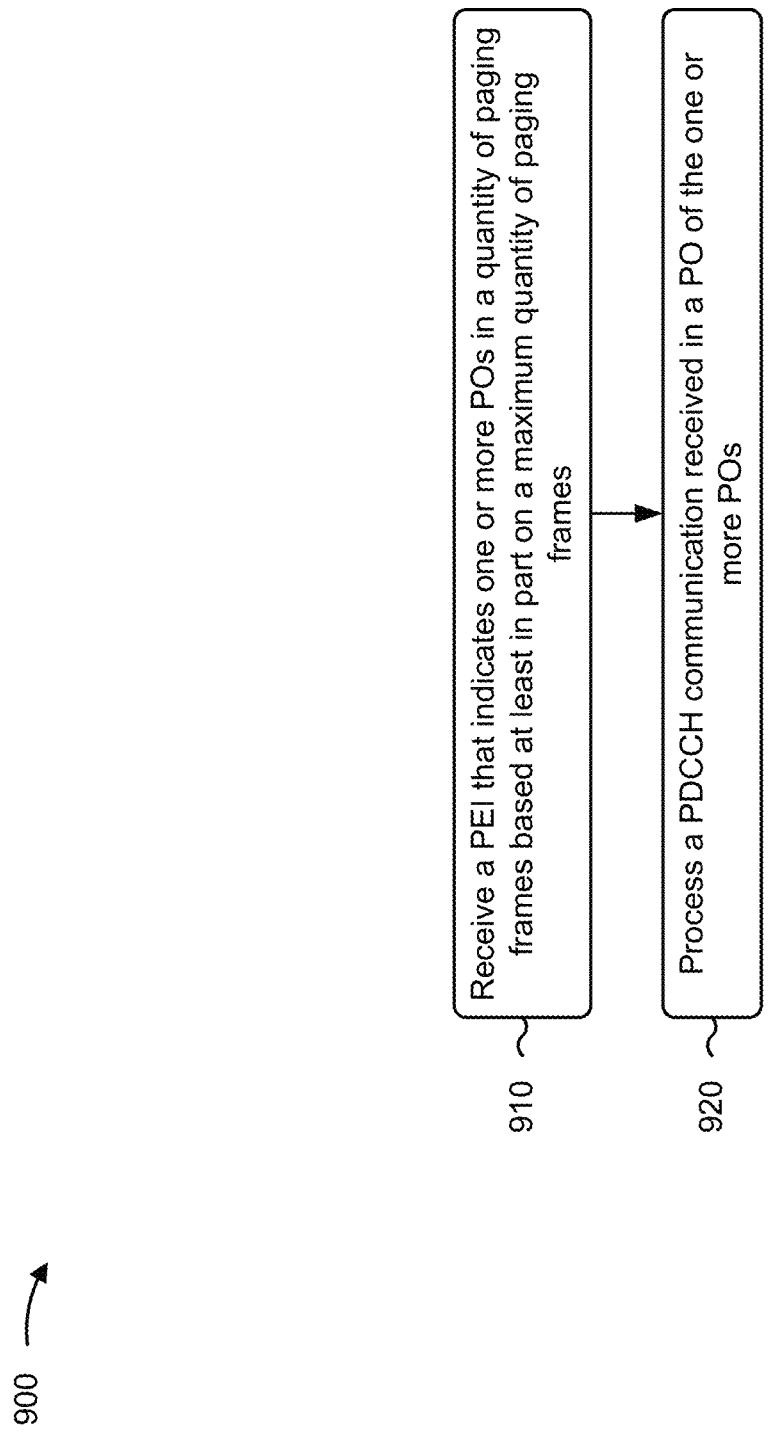
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with PEI that indicates POs in paging frames based on a maximum quantity of paging frames.

As shown in FIG. 9, in some aspects, process 900 may include receiving a PEI that indicates one or more POs in a quantity of paging frames based at least in part on a maximum quantity of paging frames (block 910). For example, the UE (e.g., using communication manager 140 and/or reception component 1302 depicted in FIG. 13) may receive a PEI that indicates one or more paging occasions (POs) in a quantity of paging frames based at least in part on a maximum quantity of paging frames, as described above.

As further shown in FIG. 9, in some aspects, process 900 may include processing a PDCCH communication received in a PO of the one or more POs (block 920). For example, the UE (e.g., using communication manager 140 and/or processing component 1310 depicted in FIG. 13) may process a PDCCH communication received in a PO of the one or more POs, as described above.

Process 900 may include additional aspects, such as any single aspect or any combination of aspects described below and/or in connection with one or more other processes described elsewhere herein.

In a first aspect, the receiving the PEI includes receiving a first PEI in a symbol in a beam, and process 900 includes receiving a second PEI in a next symbol in a next beam.

In a second aspect, alone or in combination with the first aspect, the receiving the PEI includes receiving a first PEI in a symbol in a beam, and process 900 includes receiving a second PEI in a next symbol in the beam.

In a third aspect, alone or in combination with one or more of the first and second aspects, the PEI indicates one or more POs across multiple paging frames.

In a fourth aspect, alone or in combination with one or more of the first through third aspects, the PEI indicates one or more POs within a same paging frame.

In a fifth aspect, alone or in combination with one or more of the first through fourth aspects, the PEI indicates a quantity of POs that is based at least in part on a maximum size of downlink control information that includes the PEI.

In a sixth aspect, alone or in combination with one or more of the first through fifth aspects, the quantity of POs is further based at least in part on a quantity of sub-groups for each PO.

In a seventh aspect, alone or in combination with one or more of the first through sixth aspects, the PEI includes a bitmap with bits that indicate the one or more POs.

In an eighth aspect, alone or in combination with one or more of the first through seventh aspects, the bitmap includes bits that specify one or more subgroups for each of the one or more POs.

In a ninth aspect, alone or in combination with one or more of the first through eighth aspects, process 900 includes receiving an SSB transmission, where the PEI is received at a time that is associated with the SSB transmission, and determining that the PEI indicates a PO that applies to the UE if a time difference between a start of the SSB transmission and a start of monitoring occasions or an associated paging frame satisfies a threshold.

In a tenth aspect, alone or in combination with one or more of the first through ninth aspects, the start of the SSB transmission is at a same time as the start of the monitoring occasions or the associated paging frame.

In an eleventh aspect, alone or in combination with one or more of the first through tenth aspects, the start of the monitoring occasions or the associated paging frame is after a start of the SSB transmission and before a start of a next SSB transmission.

In a twelfth aspect, alone or in combination with one or more of the first through eleventh aspects, the start of the monitoring occasions or the associated paging frame is after an end of the SSB transmission and before an end of a next SSB transmission.

In a thirteenth aspect, alone or in combination with one or more of the first through twelfth aspects, the start of the monitoring occasions or the associated paging frame is before a start of the SSB transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
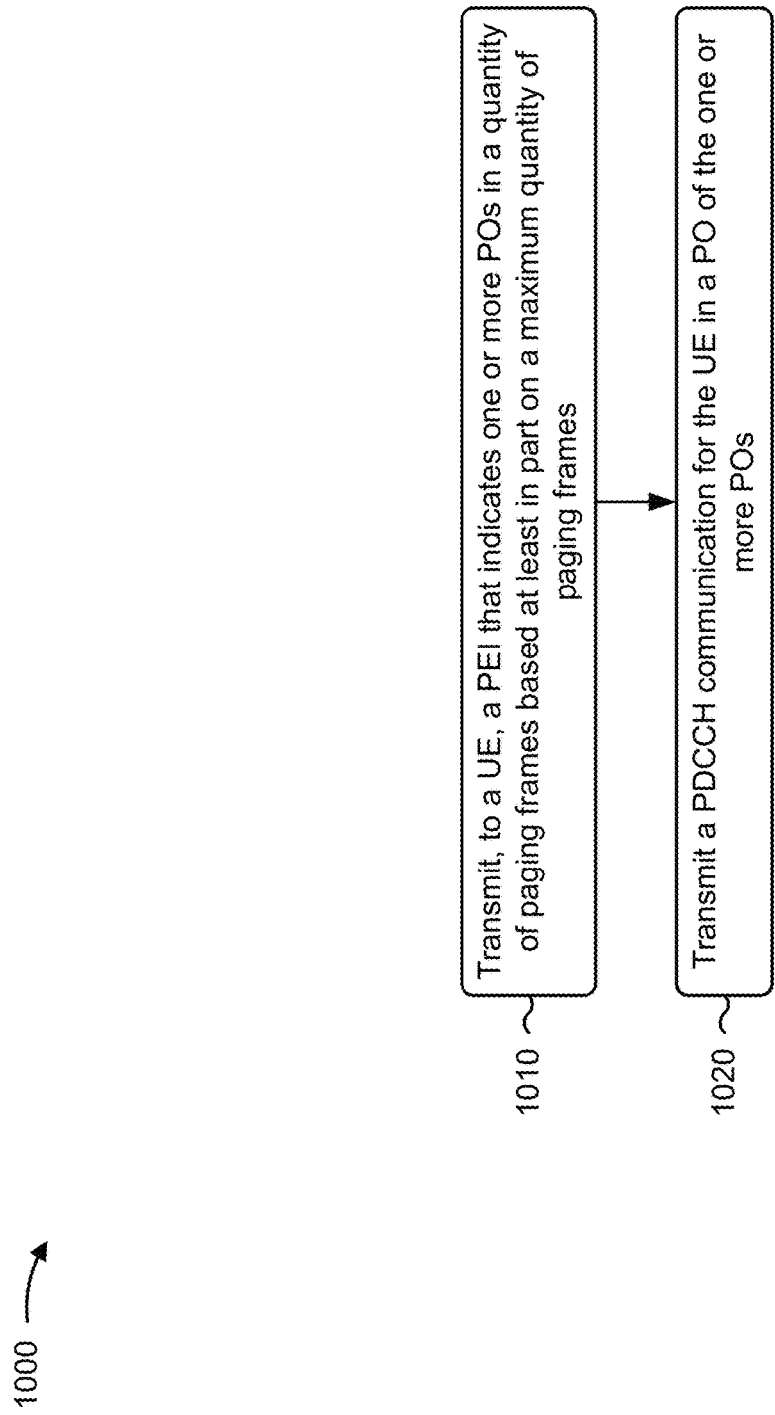
FIG. 10 is a diagram illustrating an example process performed, for example, by a network entity, in accordance with the present disclosure.

FIG. 10 is a diagram illustrating an example process 1000 performed, for example, by a network entity, in accordance with the present disclosure. Example process 1000 is an example where the network entity (e.g., base station 110) performs operations associated with using PEIs.

As shown in FIG. 10, in some aspects, process 1000 may include transmitting, to a UE, a PEI that indicates one or more POs in a quantity of paging frames based at least in part on a maximum quantity of paging frames (block 1010). For example, the network entity (e.g., using communication manager 150 and/or transmission component 1404 depicted in FIG. 14) may transmit, to a UE, a PEI that indicates one or more POs in a quantity of paging frames based at least in part on a maximum quantity of paging frames, as described above.

As further shown in FIG. 10, in some aspects, process 1000 may include transmitting a PDCCH communication for the UE in a PO of the one or more POs (block 1020). For example, the network entity (e.g., using communication manager 150 and/or transmission component 1404 depicted in FIG. 14) may transmit a PDCCH communication for the UE in a PO of the one or more POs, as described above.

Process 1000 may include additional aspects, such as any single aspect or any combination of aspects described below and/or in connection with one or more other processes described elsewhere herein.

In a first aspect, the PEI indicates one or more POs across multiple paging frames.

In a second aspect, alone or in combination with the first aspect, process 1000 includes transmitting the PEI to indicate one or more POs in a quantity of paging frames based at least in part on a maximum quantity of paging frames.

In a third aspect, alone or in combination with one or more of the first and second aspects, the PEI indicates one or more POs within a same paging frame.

In a fourth aspect, alone or in combination with one or more of the first through third aspects, the PEI indicates a quantity of POs that is based at least in part on a maximum size of downlink control information that includes the PEI.

In a fifth aspect, alone or in combination with one or more of the first through fourth aspects, the quantity of POs is further based at least in part on a quantity of sub-groups for each PO.

In a sixth aspect, alone or in combination with one or more of the first through fifth aspects, the PEI includes a bitmap with bits that indicate one or more POs for each of one or more paging frames.

In a seventh aspect, alone or in combination with one or more of the first through sixth aspects, the bitmap includes bits that specify one or more subgroups for each of the one or more POs.

In an eighth aspect, alone or in combination with one or more of the first through seventh aspects, the transmitting the PEI includes transmitting a first PEI in a symbol in a beam, and process 1000 includes transmitting a second PEI in a next symbol in the beam.

In a ninth aspect, alone or in combination with one or more of the first through eighth aspects, the transmitting the PEI includes transmitting a first PEI in a symbol in a beam, and process 1000 includes transmitting a second PEI in a next symbol in a next beam.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
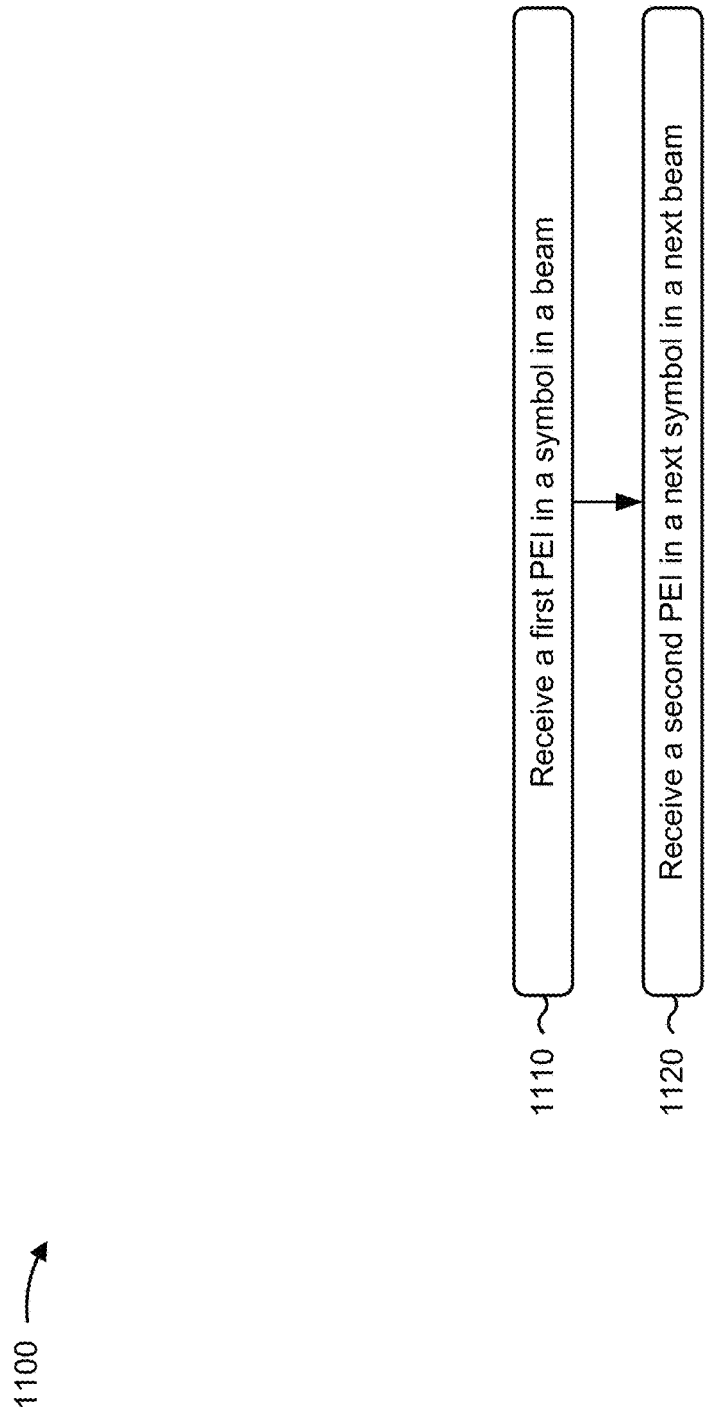
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with receiving PEIs.

As shown in FIG. 11, in some aspects, process 1100 may include receiving a first PEI in a symbol in a beam (block 1110). For example, the UE (e.g., using communication manager 140 and/or reception component 1302 depicted in FIG. 13) may receive a first PEI in a symbol in a beam, as described above.

As further shown in FIG. 11, in some aspects, process 1100 may include receiving a second PEI in a next symbol in a next beam (block 1120). For example, the UE (e.g., using communication manager 140 and/or reception component 1302 depicted in FIG. 13) may receive a second PEI in a next symbol in a next beam, as described above.

Process 1100 may include additional aspects, such as any single aspect or any combination of aspects described below and/or in connection with one or more other processes described elsewhere herein.

In a first aspect, the first PEI and the second PEI are transmitted across SSB beams first.

In a second aspect, alone or in combination with the first aspect, the first PEI and the second PEI are associated with a same set of paging occasions.

In a third aspect, alone or in combination with one or more of the first and second aspects, the first PEI indicates one or more POs in a quantity of paging frames based at least in part on a maximum quantity of paging frames.

In a fourth aspect, alone or in combination with one or more of the first through third aspects, process 1100 includes processing a PDCCH communication received in a PO of the one or more POs.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
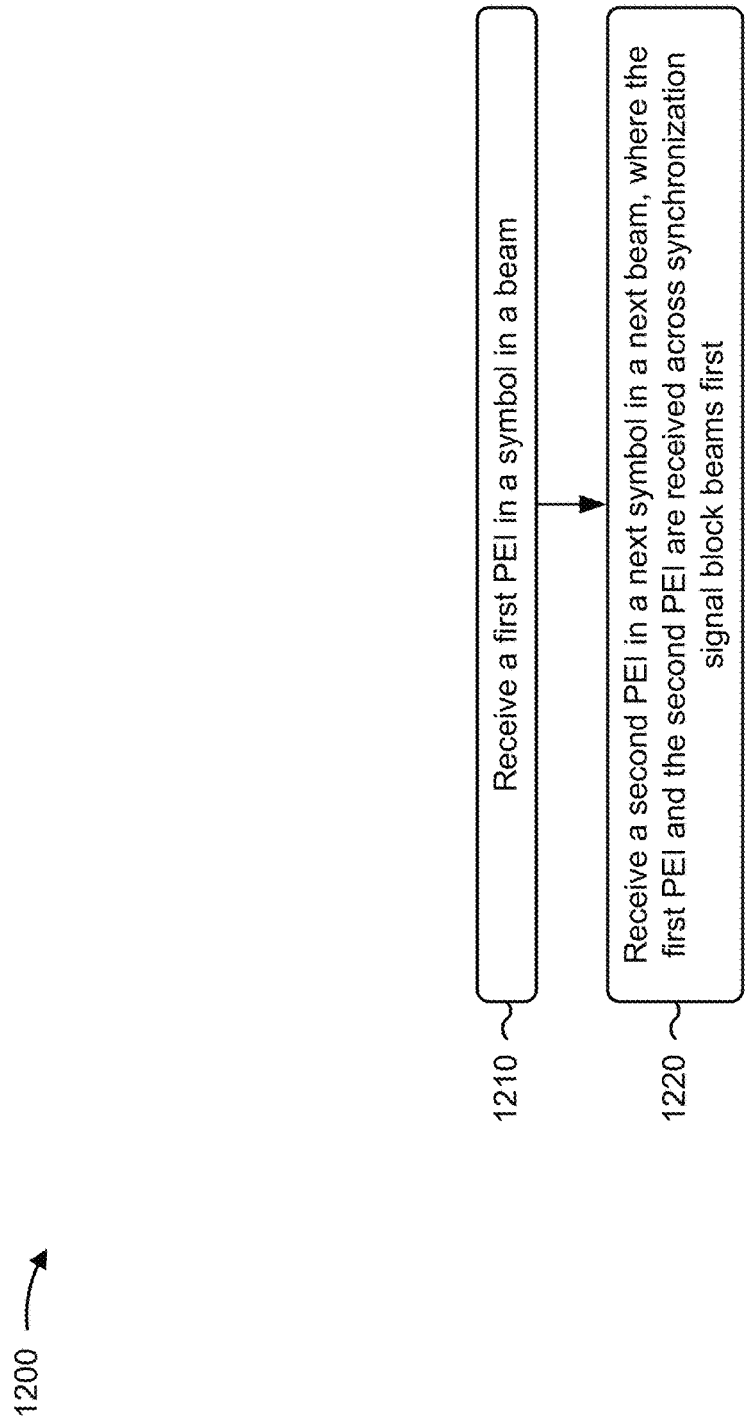
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with receiving PEIs.

As shown in FIG. 12, in aspects, process 1200 may include receiving a first PEI in a symbol in a beam (block 1210). For example, the UE (e.g., using communication manager 140 and/or reception component 1302 depicted in FIG. 13) may receive a first PEI in a symbol in a beam, as described above.

As further shown in FIG. 12, in some aspects, process 1200 may include receiving a second PEI in a next symbol in a next beam, where the first PEI and the second PEI are received across synchronization signal block beams first (block 1220). For example, the UE (e.g., using communication manager 140 and/or reception component 1302 depicted in FIG. 13) may receive a second PEI in a next symbol in a next beam, wherein the first PEI and the second PEI are received across synchronization signal block beams first, as described above.

Process 1200 may include additional aspects, such as any single aspect or any combination of aspects described below and/or in connection with one or more other processes described elsewhere herein.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
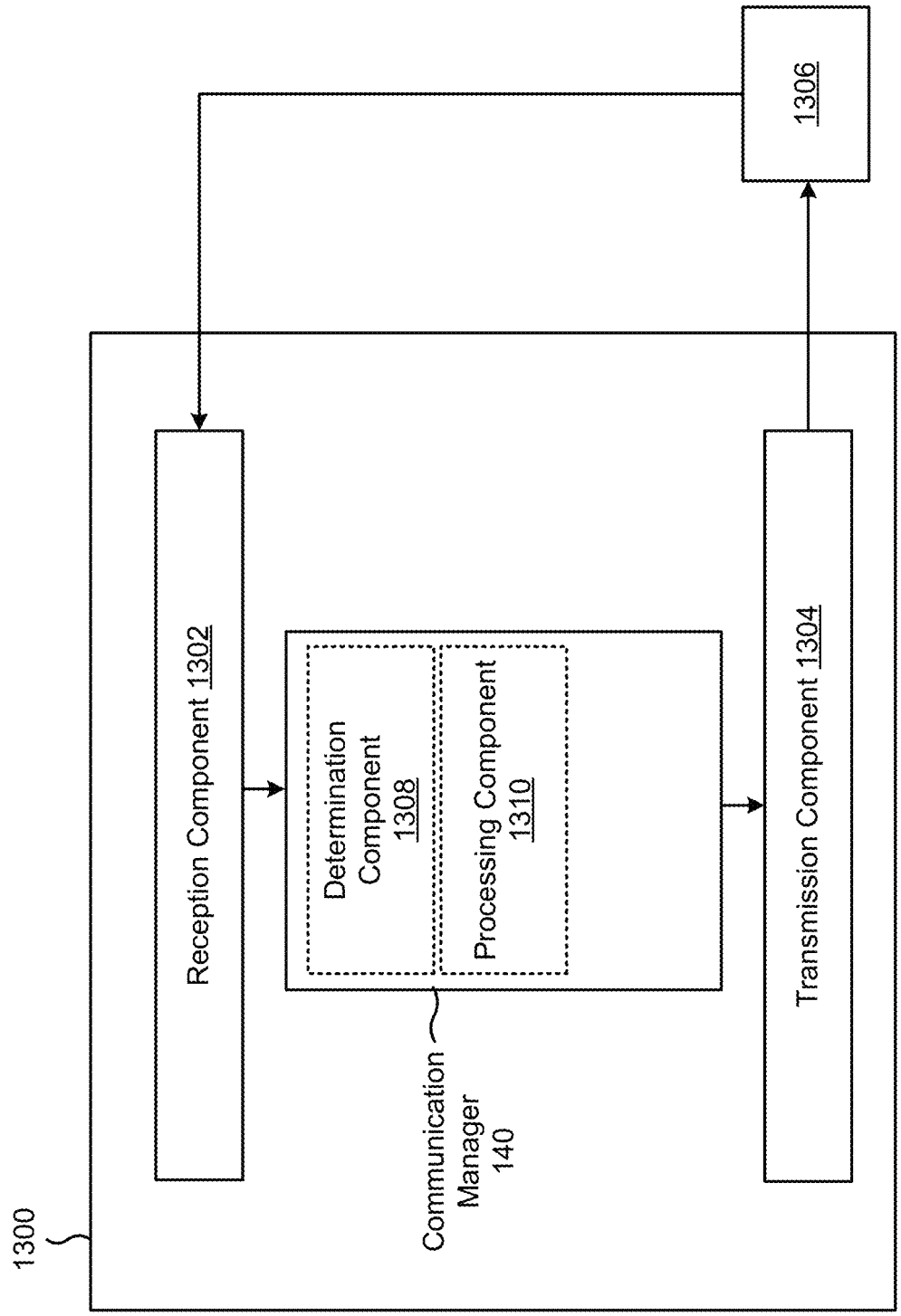
FIGS. 13-14 are diagrams of example apparatuses for wireless communication, in accordance with the present disclosure.

FIG. 13 is a diagram of an example apparatus 1300 for wireless communication. The apparatus 1300 may be a UE (e.g., a UE 120), or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, a network entity, or another wireless communication device) using the reception component 1302 and the transmission component 1304. As further shown, the apparatus 1300 may include the communication manager 140. The communication manager 140 may include one or more of a determination component 1308 and/or a processing component 1310, among other examples.

In some aspects, the apparatus 1300 may be configured to perform one or more operations described herein in connection with FIGS. 1-6. Additionally, or alternatively, the apparatus 1300 may be configured to perform one or more processes described herein, such as process 700 of FIG. 7, process 900 of FIG. 9, process 1100 of FIG. 11, process 1200 of FIG. 12, or any combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

In some aspects, the reception component 1302 may receive an SSB transmission. The reception component 1302 may receive a PEI at a time that is associated with the SSB transmission. The determination component 1308 may determine that the PEI indicates a PO that applies to the UE if a time difference between a start of the SSB transmission and a start of monitoring occasions or an associated paging frame satisfies a threshold. The processing component 1310 may process a PDCCH communication received in the PO.

In some aspects, the reception component 1302 may receive a PEI that indicates one or more POs in a quantity of paging frames based at least in part on a maximum quantity of paging frames. The processing component 1310 may process a PDCCH communication received in a PO of the one or more POs. The reception component 1302 may receive an SSB transmission, where the PEI is received at a time that is associated with the SSB transmission. The determination component 1308 may determine that the PEI indicates a PO that applies to the UE if a time difference between a start of the SSB transmission and a start of monitoring occasions or an associated paging frame satisfies a threshold.

In some aspects, the reception component 1302 may receive a first PEI in a symbol in a beam. The reception component 1302 may receive a second PEI in a next symbol in a next beam. The processing component 1310 may process a PDCCH communication received in a PO of the one or more POs.

In some aspects, the reception component 1302 may receive a first PEI in a symbol in a beam. The reception component 1302 may receive a second PEI in a next symbol in a next beam, where the first PEI and the second PEI are received across synchronization signal block beams first.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
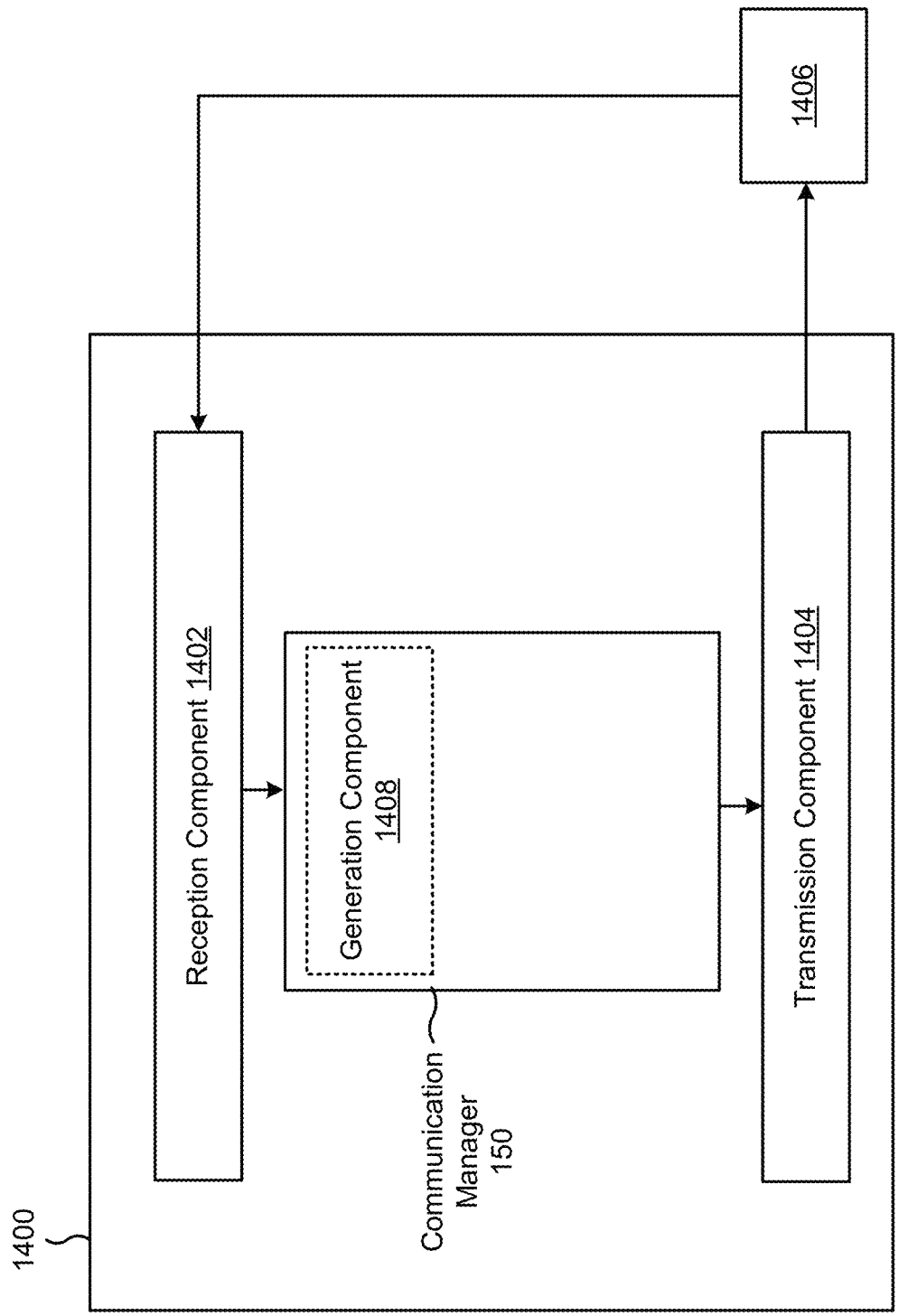

FIG. 14 is a diagram of an example apparatus 1400 for wireless communication. The apparatus 1400 may be a network entity (e.g., base station 110), or a network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a generation component 1408, among other examples.

In some aspects, the apparatus 1400 may be configured to perform one or more operations described herein in connection with FIGS. 1-6. Additionally, or alternatively, the apparatus 1400 may be configured to perform one or more processes described herein, such as process 800 of FIG. 8, process 1000 of FIG. 10, or any combination thereof. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The transmission component 1404 may transmit, to a UE, an SSB transmission. The generation component 1408 may generate a PEI at a time that is associated with the SSB transmission, where the PEI indicates a PO that applies to the UE if a time difference between a start of the SSB transmission and a start of monitoring occasions or an associated paging frame satisfies a threshold. The transmission component 1404 may transmit the PEI to the UE. The transmission component 1404 may transmit a PDCCH communication for the UE in the PO.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
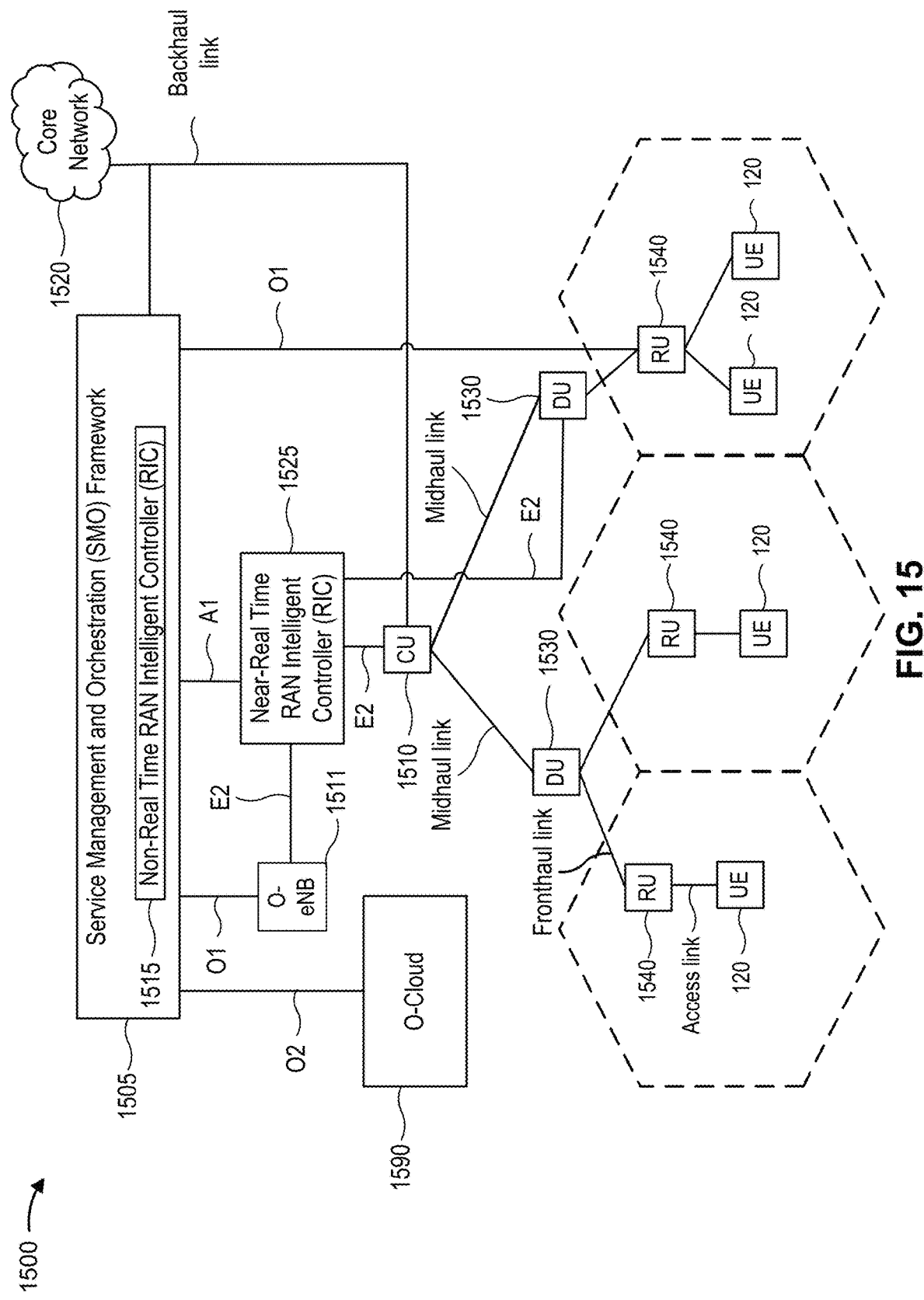
FIG. 15 is a diagram illustrating an example of a disaggregated base station, in accordance with the present disclosure.

FIG. 15 is a diagram illustrating an example of a disaggregated base station 1500, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 1500 architecture may include one or more CUs 1510 that can communicate directly with a core network 1520 via a backhaul link, or indirectly with the core network 1520 through one or more disaggregated base station units (such as a Near-RT RIC 1525 via an E2 link, or a Non-RT RIC 1515 associated with a Service Management and Orchestration (SMO) Framework 1505, or both). A CU 1510 may communicate with one or more DUs 1530 via respective midhaul links, such as an F1 interface. The DUs 1530 may communicate with one or more RUs 1540 via respective fronthaul links. The fronthaul link, the midhaul link, and the backhaul link may be generally referred to as "communication links." The RUs 1540 may communicate with respective UEs 120 via one or more RF access links. In some aspects, the UE 120 may be simultaneously served by multiple RUs 1540. The DUs 1530 and the RUs 1540 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 1510, the DUs 1530, the RUs 1540, as well as the Near-RT RICs 1525, the Non-RT RICs 1515 and the SMO Framework 1505) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1510. The CU 1510 may be configured to handle user plane functionality (i.e., Central Unit—User Plane (CU-UP)), control plane functionality (i.e., Central Unit—Control Plane (CU-CP)), or a combination thereof. In some implementations, the CU 1510 can be logically split into one or more CU-UP units and one or more CU-CP units. The CU-UP unit can communicate bidirectionally with the CU-CP unit via an interface, such as the E1 interface when implemented in an O-RAN configuration. The CU 1510 can be implemented to communicate with the DU 1530, as necessary, for network control and signaling.

The DU 1530 may correspond to a logical unit that includes one or more base station functions to control the operation of one or more RUs 1540. In some aspects, the DU 1530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1530 may further host one or more low PHY layers. Each layer (or module) can be implemented with an interface configured to communicate signals with other layers (and modules) hosted by the DU 1530, or with the control functions hosted by the CU 1510.

Lower-layer functionality can be implemented by one or more RUs 1540. In some deployments, an RU 1540, controlled by a DU 1530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1540 can be implemented to handle over the air (OTA) communication with one or more UEs 120. In some implementations, real-time and non-real-time aspects of control and user plane communication with the RU(s) 1540 can be controlled by the corresponding DU 1530. In some scenarios, this configuration can enable the DU(s) 1530 and the CU 1510 to be implemented in a cloud-based RAN architecture, such as a vRAN architecture.

The SMO Framework 1505 may be configured to support RAN deployment and provisioning of non-virtualized and virtualized network elements. For non-virtualized network elements, the SMO Framework 1505 may be configured to support the deployment of dedicated physical resources for RAN coverage requirements which may be managed via an operations and maintenance interface (such as an O1 interface). For virtualized network elements, the SMO Framework 1505 may be configured to interact with a cloud computing platform (such as an open cloud (O-Cloud) 1590) to perform network element life cycle management (such as to instantiate virtualized network elements) via a cloud computing platform interface (such as an O2 interface). Such virtualized network elements can include, but are not limited to, CUs 1510, DUs 1530, RUs 1540 and Near-RT RICs 1525. In some implementations, the SMO Framework 1505 can communicate with a hardware aspect of a 4G RAN, such as an open eNB (O-eNB) 1511, via an O1 interface. Additionally, in some implementations, the SMO Framework 1505 can communicate directly with one or more RUs 1540 via an O1 interface. The SMO Framework 1505 also may include a Non-RT RIC 1515 configured to support functionality of the SMO Framework 1505.

The Non-RT RIC 1515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1525. The Non-RT RIC 1515 may be coupled to or communicate with (such as via an A1 interface) the Near-RT RIC 1525. The Near-RT RIC 1525 may be configured to include a logical function that enables near-real-time control and optimization of RAN elements and resources via data collection and actions over an interface (such as via an E2 interface) connecting one or more CUs 1510, one or more DUs 1530, or both, as well as an O-eNB, with the Near-RT RIC 1525.

In some implementations, to generate AI/ML models to be deployed in the Near-RT RIC 1525, the Non-RT RIC 1515 may receive parameters or external enrichment information from external servers. Such information may be utilized by the Near-RT RIC 1525 and may be received at the SMO Framework 1505 or the Non-RT RIC 1515 from non-network data sources or from network functions. In some examples, the Non-RT RIC 1515 or the Near-RT RIC 1525 may be configured to tune RAN behavior or performance. For example, the Non-RT RIC 1515 may monitor long-term trends and patterns for performance and employ AI/ML models to perform corrective actions through the SMO Framework 1505 (such as reconfiguration via O1) or via creation of RAN management policies (such as A1 policies).

As indicated above, FIG. 15 is provided as an example. Other examples may differ from what is described with regard to FIG. 15.

The following provides an overview of some Aspects of the present disclosure:

Aspect 1: A method of wireless communication performed by a user equipment (UE), comprising: receiving a synchronization signal block (SSB) transmission; receiving a paging early indication (PEI) at a time that is associated with the SSB transmission; determining that the PEI indicates a paging occasion (PO) that applies to the UE if a time difference between a start of the SSB transmission and a start of monitoring occasions or an associated paging frame satisfies a threshold; and processing a physical downlink control channel (PDCCH) communication received in the PO.

Aspect 2: The method of Aspect 1, wherein the start of the SSB transmission is at a same time as the start of the monitoring occasions or the associated paging frame.

Aspect 3: The method of Aspect 1, wherein the start of the monitoring occasions or the associated paging frame is after a start of the SSB transmission and before a start of a next SSB transmission.

Aspect 4: The method of Aspect 1, wherein the start of the monitoring occasions or the associated paging frame is after an end of the SSB transmission and before an end of a next SSB transmission.

Aspect 5: The method of Aspect 1, wherein the start of the monitoring occasions or the associated paging frame is before a start of the SSB transmission.

Aspect 6: The method of any of Aspects 1-5, wherein the SSB transmission includes an SSB for a single beam.

Aspect 7: The method of any of Aspects 1-5, wherein the SSB transmission includes an SSB burst for multiple beams.

Aspect 8: The method of any of Aspects 1-7, wherein the PEI indicates one or more POs across multiple paging frames.

Aspect 9: The method of any of Aspects 1-7, wherein the PEI indicates one or more POs within a same paging frame.

Aspect 10: The method of any of Aspects 1-9, wherein the PEI indicates a quantity of POs that is based at least in part on a maximum size of downlink control information that includes the PEI.

Aspect 11: The method of Aspect 10, wherein the quantity of POs is further based at least in part on a quantity of sub-groups for each PO.

Aspect 12: The method of any of Aspects 1-11, wherein the PEI includes a bitmap with bits that indicate one or more POs for each of one or more paging frames.

Aspect 13: The method of Aspect 12, wherein the bitmap includes bits that specify one or more subgroups for each of the one or more POs.

Aspect 14: A method of wireless communication performed by a network entity, comprising: transmitting, to a user equipment (UE), a synchronization signal block (SSB) transmission; transmitting, to the UE, a paging early indication (PEI) at a time that is associated with the SSB transmission, wherein the PEI indicates a paging occasion (PO) that applies to the UE if a time difference between a start of the SSB transmission and a start of monitoring occasions or an associated paging frame satisfies a threshold; and transmitting a physical downlink control channel (PDCCH) communication for the UE in the PO.

Aspect 15: The method of Aspect 14, wherein the start of the SSB transmission is at a same time as the start of the monitoring occasions or the associated paging frame.

Aspect 16: The method of Aspect 14, wherein the start of the monitoring occasions or the associated paging frame is after a start of the SSB transmission and before a start of a next SSB transmission.

Aspect 17: The method of Aspect 14, wherein the start of the monitoring occasions or the associated paging frame is after an end of the SSB transmission and before an end of a next SSB transmission.

Aspect 18: The method of Aspect 14, wherein the start of the monitoring occasions or the associated paging frame is before a start of the SSB transmission.

Aspect 19: The method of any of Aspects 14-18, wherein the SSB transmission includes an SSB for a single beam.

Aspect 20: The method of any of Aspects 14-18, wherein the SSB transmission includes an SSB burst for multiple beams.

Aspect 21: The method of any of Aspects 14-20, wherein the PEI indicates one or more POs across multiple paging frames.

Aspect 22: The method of Aspect 21, wherein the transmitting the PEI includes transmitting the PEI to indicate one or more POs in a quantity of paging frames based at least in part on a maximum quantity of paging frames.

Aspect 23: The method of any of Aspects 14-22, wherein the PEI indicates one or more POs within a same paging frame.

Aspect 24: The method of any of Aspects 14-23, wherein the PEI indicates a quantity of POs that is based at least in part on a maximum size of downlink control information that includes the PEI.

Aspect 25: The method of Aspect 24, wherein the quantity of POs is further based at least in part on a quantity of sub-groups for each PO.

Aspect 26: The method of any of Aspects 14-25, wherein the PEI includes a bitmap with bits that indicate one or more POs for each of one or more paging frames.

Aspect 27: The method of Aspect 26, wherein the bitmap includes bits that specify one or more subgroups for each of the one or more POs.

Aspect 28: The method of any of Aspects 14-27, wherein the transmitting the PEI at the time includes transmitting a first PEI in a symbol in a beam, and wherein the method further comprises transmitting a second PEI at the time in a next symbol in the beam.

Aspect 29: The method of any of Aspects 14-27, wherein the transmitting the PEI at the time includes transmitting a first PEI in a symbol in a beam, and wherein the method further comprises transmitting a second PEI at the time in a next symbol in a next beam.

Aspect 30: A method of wireless communication performed by a user equipment (UE), comprising: receiving a paging early indication (PEI) that indicates one or more paging occasions (POs) in a quantity of paging frames based at least in part on a maximum quantity of paging frames; and processing a physical downlink control channel (PDCCH) communication received in a PO of the one or more POs.

Aspect 31: The method of Aspect 30, wherein the receiving the PEI includes receiving a first PEI in a symbol in a beam, and wherein the method further comprises receiving a second PEI in a next symbol in a next beam.

Aspect 32: The method of Aspect 30, wherein receiving the PEI includes receiving a first PEI in a symbol in a beam, and wherein the method further comprises receiving a second PEI in a next symbol in the beam.

Aspect 33: The method of any of Aspects 30-32, wherein the PEI indicates one or more POs across multiple paging frames.

Aspect 34: The method of any of Aspects 30-32, wherein the PEI indicates one or more POs within a same paging frame.

Aspect 35: The method of any of Aspects 30-34, wherein the PEI indicates a quantity of POs that is based at least in part on a maximum size of downlink control information that includes the PEI.

Aspect 36: The method of Aspect 35, wherein the quantity of POs is further based at least in part on a quantity of sub-groups for each PO.

Aspect 37: The method of any of Aspects 30-36, wherein the PEI includes a bitmap with bits that indicate the one or more POs.

Aspect 38: The method of Aspect 37, wherein the bitmap includes bits that specify one or more subgroups for each of the one or more POs.

Aspect 39: A method of wireless communication performed by a network entity, comprising: transmitting a paging early indication (PEI) that indicates one or more paging occasions (POs) in a quantity of paging frames based at least in part on a maximum quantity of paging frames; and transmitting a physical downlink control channel (PDCCH) communication for a user equipment (UE) in a PO of the one or more POs.

Aspect 40: The method of Aspect 39, wherein the PEI indicates one or more POs across multiple paging frames.

Aspect 41: The method of Aspect 39 or 40, further comprising transmitting the PEI to indicate one or more POs in a quantity of paging frames based at least in part on a maximum quantity of paging frames.

Aspect 42: The method of Aspect 39, wherein the PEI indicates one or more POs within a same paging frame.

Aspect 43: The method of any of Aspects 39-42, wherein the PEI indicates a quantity of POs that is based at least in part on a maximum size of downlink control information that includes the PEI.

Aspect 44: The method of Aspect 43, wherein the quantity of POs is further based at least in part on a quantity of sub-groups for each PO.

Aspect 45: The method of any of Aspects 39-44, wherein the PEI includes a bitmap with bits that indicate one or more POs for each of one or more paging frames.

Aspect 46: The method of Aspect 45, wherein the bitmap includes bits that specify one or more subgroups for each of the one or more POs.

Aspect 47: The method of any of Aspects 39-46, wherein the transmitting the PEI includes transmitting a first PEI in a symbol in a beam, and wherein the method includes transmitting a second PEI in a next symbol in the beam.

Aspect 48: The method of any of Aspects 39-46, wherein the transmitting the PEI includes transmitting a first PEI in a symbol in a beam, and wherein the method includes transmitting a second PEI in a next symbol in a next beam.

Aspect 50: A method of wireless communication performed by a user equipment (UE), comprising: receiving a first PEI in a symbol in a beam; and receiving a second PEI in a next symbol in a next beam.

Aspect 51: The method of Aspect 50, wherein the first PEI and the second PEI are transmitted across synchronization signal block (SSB) beams first.

Aspect 52: The method of Aspect 50 or 51, wherein the first PEI and the second PEI are associated with a same set of paging occasions.

Aspect 53: The method of any of Aspects 50-52, wherein the first PEI indicates one or more paging occasions (POs) in a quantity of paging frames based at least in part on a maximum quantity of paging frames.

Aspect 54: The method of any of Aspects 50-52, wherein the method further comprises processing a physical downlink control channel (PDCCH) communication received in a PO of the one or more POs.

Aspect 55: A method of wireless communication performed by a user equipment (UE), comprising: receiving a first paging early indication (PEI) in a symbol in a beam; and receiving a second PEI in a next symbol in a next beam, wherein the first PEI and the second PEI are received across synchronization signal block beams first.

Aspect 56: An apparatus for wireless communication at a device, comprising a processor; memory coupled with the processor; and instructions stored in the memory and executable by the processor to cause the apparatus to perform the method of one or more of Aspects 1-55.

Aspect 57: A device for wireless communication, comprising memory, and one or more processors coupled to the memory, the memory comprising instructions executable by the one or more processors to cause the device to perform the method of one or more of Aspects 1-55.

Aspect 58: A device for wireless communication, comprising a memory and one or more processors coupled to the memory, the one or more processors configured to perform the method of one or more of Aspects 1-55.

Aspect 59: An apparatus for wireless communication, comprising at least one means for performing the method of one or more of Aspects 1-55.

Aspect 60: A non-transitory computer-readable medium storing code for wireless communication, the code comprising instructions executable by a processor to perform the method of one or more of Aspects 1-55.

Aspect 61: A non-transitory computer-readable medium storing a set of instructions for wireless communication, the set of instructions comprising one or more instructions that, when executed by one or more processors of a device, cause the device to perform the method of one or more of Aspects 1-55.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    memory; and
    one or more processors coupled to the memory, the memory comprising instructions executable by the one or more processors to cause the UE to:
        receive, in a first beam, a first paging early indication (PEI) that indicates one or more paging occasions (POs) in a quantity of paging frames based at least in part on a maximum quantity of paging frames; and
        receive a second PEI in a second beam, wherein the first PEI and the second PEI are a same PEI.

2. The UE of claim 1, wherein the first beam and the second beam are synchronization signal block (SSB) beams, wherein a quantity of beams in which PEIs are transmitted is configured, and wherein a quantity of physical downlink control channel monitoring occasions for PEIs is configured per SSB.

3. The UE of claim 1, wherein the instructions, associated with receiving the first PEI and the second PEI, are further executable by the one or more processors to cause the UE to receive the first PEI in a symbol in the first beam and receive the second PEI in a next symbol in the second beam.

4. The UE of claim 1, wherein the first PEI indicates the one or more POs across multiple paging frames.

5. The UE of claim 1, wherein the first PEI indicates the one or more POs within a same paging frame.

6. The UE of claim 1, wherein the first PEI indicates a quantity of POs that is based at least in part on a maximum size of downlink control information that includes the first PEI.

7. The UE of claim 6, wherein the quantity of POs is further based at least in part on a quantity of sub-groups for each PO.

8. The UE of claim 1, wherein the first PEI includes a bitmap with bits that indicate the one or more POs.

9. The UE of claim 8, wherein the bitmap includes bits that specify one or more subgroups for each of the one or more POs.

10. The UE of claim 8, wherein the instructions are further executable by the one or more processors to cause the UE to:

receive a synchronization signal block (SSB) transmission, wherein the first PEI is received at a time that is associated with the SSB transmission; and determine that the first PEI indicates a PO that applies to the UE if a time difference between a start of the SSB transmission and a start of monitoring occasions or an associated paging frame satisfies a threshold.

11. The UE of claim 10, wherein the start of the SSB transmission is at a same time as the start of the monitoring occasions or the associated paging frame.

12. The UE of claim 10, wherein the start of the monitoring occasions or the associated paging frame is after the start of the SSB transmission and before a start of a next SSB transmission.

13. The UE of claim 10, wherein the start of the monitoring occasions or the associated paging frame is after an end of the SSB transmission and before an end of a next SSB transmission.

14. The UE of claim 10, wherein the start of the monitoring occasions or the associated paging frame is before the start of the SSB transmission.

15. A network entity for wireless communication, comprising:
memory; and
one or more processors coupled to the memory, the memory comprising instructions executable by the one or more processors to cause the network entity to:
transmit, to a user equipment (UE) in a first beam, a first paging early indication (PEI) that indicates one or more paging occasions (POs) in a quantity of paging frames based at least in part on a maximum quantity of paging frames; and
transmit a second PEI in a second beam, wherein the first PEI and the second PEI are a same PEI.

16. The network entity of claim 15, wherein the first PEI indicates one or more POs across multiple paging frames.

17. The network entity of claim 15, wherein the instructions, associated with transmitting the first PEI and the second PEI, are further executable by the one or more processors to cause the network entity to transmit the first PEI and the second PEI to indicate the one or more POs in the quantity of paging frames based at least in part on the maximum quantity of paging frames.

18. The network entity of claim 15, wherein the first PEI indicates the one or more POs within a same paging frame.

19. The network entity of claim 15, wherein the first PEI indicates a quantity of POs that is based at least in part on a maximum size of downlink control information that includes the first PEI.

20. The network entity of claim 19, wherein the quantity of POs is further based at least in part on a quantity of sub-groups for each PO.

21. The network entity of claim 15, wherein the first PEI includes a bitmap with bits that indicate one or more POs for each of one or more paging frames.

22. The network entity of claim 21, wherein the bitmap includes bits that specify one or more subgroups for each of the one or more POs.

23. The network entity of claim 15, wherein the instructions, associated with transmitting the first PEI and the second PEI, are further executable by the one or more processors to cause the network entity to transmit the first PEI in a symbol in the first beam and transmit the second PEI in a next symbol in the second beam.

24. The network entity of claim 15, wherein the first beam and the second beam are synchronization signal block (SSB) beams, and wherein a quantity of physical downlink control channel monitoring occasions for PEIs are configured per SSB.

25. A user equipment (UE) for wireless communication, comprising:
memory; and
one or more processors coupled to the memory, the memory comprising instructions executable by the one or more processors to cause the UE to:
receive a first paging early indication (PEI) in a symbol in a beam; and
receive a second PEI in a next symbol in a next beam, wherein the first PEI and the second PEI are a same PEI.

26. The UE of claim 25, wherein the first PEI and the second PEI are transmitted across synchronization signal block (SSB) beams, wherein a quantity of beams in which PEIs are transmitted is configured, and wherein a quantity of physical downlink control channel monitoring occasions for PEIs is configured per SSB.

27. The UE of claim 25, wherein the first PEI and the second PEI are associated with a same set of paging occasions.

28. The UE of claim 25, wherein the first PEI indicates one or more paging occasions (POs) in a quantity of paging frames based at least in part on a maximum quantity of paging frames.

29. A network entity for wireless communication, comprising:
memory; and
one or more processors coupled to the memory, the memory comprising instructions executable by the one or more processors to cause the network entity to:
transmit a first paging early indication (PEI) in a symbol in a beam; and
transmit a second PEI in a next symbol in a next beam, wherein the first PEI and the second PEI are a same PEI.

30. The network entity of claim 29, wherein the first PEI and the second PEI are transmitted across synchronization signal block (SSB) beams, wherein a quantity of beams in which PEIs are transmitted is configured, and wherein a quantity of physical downlink control channel monitoring occasions for PEIs is configured per SSB.

* * * * *